(12) United States Patent
King et al.

(10) Patent No.: US 10,007,393 B2
(45) Date of Patent: Jun. 26, 2018

(54) 3D VIEW OF FILE STRUCTURE

(75) Inventors: Nicholas V. King, San Jose, CA (US); Todd Benjamin, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 885 days.

(21) Appl. No.: 12/689,834

(22) Filed: Jan. 19, 2010

(65) Prior Publication Data

US 2011/0179368 A1   Jul. 21, 2011

(51) Int. Cl.
*G06F 3/00* (2006.01)
*G06F 3/0481* (2013.01)
*G06F 3/0482* (2013.01)
*G06F 3/0488* (2013.01)
*G06F 17/30* (2006.01)

(52) U.S. Cl.
CPC ........ *G06F 3/04815* (2013.01); *G06F 3/0482* (2013.01); *G06F 3/04883* (2013.01); *G06F 17/30126* (2013.01); *G06F 2203/04802* (2013.01); *G06F 2203/04808* (2013.01)

(58) Field of Classification Search
CPC ........................................ G06F 3/0481–3/0489
USPC ......................................................... 715/769
See application file for complete search history.

(56) References Cited

U.S. PATENT DOCUMENTS

| | | | | |
|---|---|---|---|---|
| 5,312,478 A * | 5/1994 | Reed et al. | 715/205 |
| 5,497,454 A * | 3/1996 | Bates | G09G 5/14 |
| | | | 715/799 |
| 5,515,486 A * | 5/1996 | Amro et al. | 715/848 |
| 5,546,529 A * | 8/1996 | Bowers et al. | 715/848 |
| 5,671,381 A * | 9/1997 | Strasnick et al. | 715/848 |
| 5,678,015 A * | 10/1997 | Goh | 715/782 |
| 5,754,809 A * | 5/1998 | Gandre | 715/782 |
| 5,801,704 A * | 9/1998 | Oohara et al. | 715/856 |
| 5,825,352 A * | 10/1998 | Bisset | G06F 3/044 |
| | | | 345/157 |
| 5,835,079 A * | 11/1998 | Shieh | G06F 3/0488 |
| | | | 345/156 |
| 5,835,094 A * | 11/1998 | Ermel et al. | 715/848 |
| 5,838,326 A * | 11/1998 | Card et al. | 715/775 |
| 5,861,885 A * | 1/1999 | Strasnick | G06F 3/04815 |
| | | | 715/850 |
| 5,870,734 A * | 2/1999 | Kao | |
| 5,877,775 A * | 3/1999 | Theisen | G06T 15/00 |
| | | | 345/440 |
| 5,880,733 A * | 3/1999 | Horvitz et al. | 715/850 |
| 5,943,679 A * | 8/1999 | Niles et al. | 715/247 |
| 5,956,025 A * | 9/1999 | Goulden | G06F 3/033 |
| | | | 345/169 |
| 6,005,579 A * | 12/1999 | Sugiyama et al. | 715/855 |
| 6,012,072 A * | 1/2000 | Lucas et al. | 715/210 |
| 6,054,989 A * | 4/2000 | Robertson et al. | 715/848 |
| 6,088,032 A * | 7/2000 | Mackinlay | 715/848 |
| 6,121,969 A * | 9/2000 | Jain et al. | 715/850 |
| 6,166,738 A * | 12/2000 | Robertson et al. | 715/839 |
| 6,222,465 B1 * | 4/2001 | Kumar et al. | 341/20 |
| 6,229,542 B1 * | 5/2001 | Miller | 715/782 |

(Continued)

*Primary Examiner* — Steven B Theriault
(74) *Attorney, Agent, or Firm* — Dentons US LLP

(57) ABSTRACT

A file structure or data hierarchy can be navigated using 3D gesture inputs. For example, objects can be arranged in a plurality of layers. A user input, including a 3D gesture input having a movement in proximity to a display surface can be detected. Different layers can be navigated in response to a movement component that is perpendicular to the display surface.

46 Claims, 12 Drawing Sheets

(56) References Cited

U.S. PATENT DOCUMENTS

| | | | |
|---|---|---|---|
| 6,253,218 B1* | 6/2001 | Aoki et al. ................... 715/201 |
| 6,323,846 B1 | 11/2001 | Westerman et al. |
| 6,621,509 B1* | 9/2003 | Eiref et al. ................... 715/836 |
| 6,647,534 B1* | 11/2003 | Graham ....................... 715/205 |
| 6,774,914 B1* | 8/2004 | Benayoun .................... 345/650 |
| 6,798,429 B2* | 9/2004 | Bradski ........................ 345/156 |
| 6,816,175 B1* | 11/2004 | Hamp et al. .................. 715/854 |
| 6,822,638 B2* | 11/2004 | Dobies ............... G06F 3/03543 345/157 |
| 6,880,132 B2* | 4/2005 | Uemura ........................ 715/848 |
| 6,888,536 B2 | 5/2005 | Westerman et al. |
| 6,976,228 B2* | 12/2005 | Bernhardson ................ 715/830 |
| 6,990,637 B2 | 1/2006 | Anthony et al. ............. 715/851 |
| 7,043,701 B2* | 5/2006 | Gordon ........................ 715/848 |
| 7,107,549 B2* | 9/2006 | Deaton et al. ............... 715/836 |
| 7,117,453 B2* | 10/2006 | Drucker et al. .............. 715/833 |
| 7,119,819 B1* | 10/2006 | Robertson et al. ........... 715/782 |
| 7,126,579 B2* | 10/2006 | Ritter ........................... 345/156 |
| 7,134,092 B2* | 11/2006 | Fung et al. ................... 715/779 |
| 7,134,095 B1* | 11/2006 | Smith et al. .................. 715/860 |
| 7,142,210 B2* | 11/2006 | Schwuttke et al. .......... 345/440 |
| 7,146,576 B2* | 12/2006 | Chang et al. ................. 715/848 |
| 7,173,604 B2* | 2/2007 | Marvit et al. ................ 345/156 |
| 7,178,111 B2* | 2/2007 | Glein et al. .................. 715/848 |
| 7,194,527 B2* | 3/2007 | Drucker et al. .............. 709/220 |
| 7,215,323 B2* | 5/2007 | Gombert et al. ............. 345/157 |
| 7,216,305 B1* | 5/2007 | Jaeger .......................... 715/849 |
| 7,249,327 B2* | 7/2007 | Nelson et al. ................ 715/782 |
| 7,278,115 B1* | 10/2007 | Conway ............. G06F 3/04815 345/418 |
| 7,292,243 B1* | 11/2007 | Burke .......................... 345/440 |
| 7,340,678 B2* | 3/2008 | Chiu et al. ................... 715/734 |
| 7,383,497 B2* | 6/2008 | Glenner et al. .............. 715/231 |
| 7,392,488 B2* | 6/2008 | Card et al. ................... 715/853 |
| 7,404,151 B2* | 7/2008 | Borchardt et al. ........... 715/850 |
| 7,412,650 B2* | 8/2008 | Gallo ........................... 715/700 |
| 7,417,680 B2* | 8/2008 | Aoki et al. ............. 348/333.05 |
| 7,433,179 B2* | 10/2008 | Hisano et al. ........... 361/679.27 |
| 7,456,823 B2* | 11/2008 | Poupyrev et al. ........... 345/173 |
| 7,468,742 B2* | 12/2008 | Ahn et al. ................ 348/207.99 |
| 7,479,948 B2* | 1/2009 | Kim et al. .................... 345/173 |
| 7,480,873 B2* | 1/2009 | Kawahara .................... 715/848 |
| 7,509,321 B2* | 3/2009 | Wong et al. |
| 7,511,710 B2* | 3/2009 | Barrett ......................... 345/419 |
| 7,523,414 B2* | 4/2009 | Schmidt ............... G06F 3/0481 715/762 |
| 7,557,804 B1* | 7/2009 | McDaniel ............. G06T 19/20 345/419 |
| 7,606,819 B2* | 10/2009 | Audet et al. |
| 7,607,150 B1* | 10/2009 | Kobayashi et al. ............ 725/41 |
| 7,657,845 B2* | 2/2010 | Drucker et al. .............. 715/833 |
| 7,663,620 B2* | 2/2010 | Robertson et al. ........... 345/419 |
| 7,665,033 B2* | 2/2010 | Byrne et al. .................. 715/782 |
| 7,680,817 B2* | 3/2010 | Audet et al. ........... 707/999.102 |
| 7,683,883 B2* | 3/2010 | Touma et al. ................ 345/163 |
| 7,698,658 B2* | 4/2010 | Ohwa et al. .................. 715/835 |
| 7,710,423 B2* | 5/2010 | Drucker et al. .............. 345/474 |
| 7,716,604 B2* | 5/2010 | Kataoka et al. .............. 715/835 |
| 7,719,523 B2* | 5/2010 | Hillis ............................ 345/173 |
| 7,724,242 B2* | 5/2010 | Hillis et al. .................. 345/173 |
| 7,725,839 B2* | 5/2010 | Michaels ..................... 715/836 |
| 7,728,821 B2* | 6/2010 | Hillis et al. .................. 345/173 |
| 7,730,423 B2* | 6/2010 | Graham ....................... 715/828 |
| 7,761,813 B2* | 7/2010 | Kim et al. .................... 715/836 |
| 7,765,266 B2* | 7/2010 | Kropivny ............ H04L 12/5885 370/261 |
| 7,840,907 B2* | 11/2010 | Kikuchi et al. .............. 715/790 |
| 7,840,912 B2* | 11/2010 | Elias ................... G06F 3/04883 715/863 |
| 7,880,726 B2* | 2/2011 | Nakadaira et al. ........... 345/173 |
| 7,907,124 B2* | 3/2011 | Hillis et al. .................. 345/173 |
| 7,917,869 B2* | 3/2011 | Anderson .................... 715/850 |
| 7,956,869 B1* | 6/2011 | Gilra .................... G06F 3/0481 345/157 |
| 7,979,879 B2* | 7/2011 | Kazama .............. G06F 3/04815 345/418 |
| 7,986,324 B2* | 7/2011 | Funaki ................ G06F 3/04815 345/440 |
| 7,995,078 B2* | 8/2011 | Baar ............................ 345/660 |
| 8,020,110 B2* | 9/2011 | Hurst .................. G06F 17/30643 715/762 |
| 8,024,671 B2* | 9/2011 | Lee et al. ..................... 715/848 |
| 8,046,714 B2* | 10/2011 | Yahiro et al. ................. 715/810 |
| 8,059,101 B2* | 11/2011 | Westerman et al. .......... 345/173 |
| 8,064,704 B2* | 11/2011 | Kim et al. .................... 382/190 |
| 8,069,404 B2* | 11/2011 | Audet ........................... 715/203 |
| 8,072,439 B2* | 12/2011 | Hillis et al. .................. 345/173 |
| 8,078,966 B2* | 12/2011 | Audet ........................... 715/273 |
| 8,103,963 B2* | 1/2012 | Ikeda et al. .................. 715/764 |
| 8,111,255 B2* | 2/2012 | Park ............................. 345/419 |
| 8,130,211 B2* | 3/2012 | Abernathy ................... 345/176 |
| 8,139,043 B2* | 3/2012 | Hillis ........................... 345/173 |
| 8,151,185 B2* | 4/2012 | Audet ........................... 715/237 |
| 8,188,985 B2* | 5/2012 | Hillis et al. .................. 345/173 |
| 8,209,628 B1* | 6/2012 | Davidson .............. G06F 3/0487 715/790 |
| 8,214,793 B1* | 7/2012 | Muthuswamy ..... G06F 9/44505 717/100 |
| 8,230,358 B1* | 7/2012 | Chaudhri ..................... 715/773 |
| 8,232,990 B2* | 7/2012 | King et al. ................... 345/419 |
| 8,259,163 B2* | 9/2012 | Bell .............................. 348/51 |
| 8,269,729 B2* | 9/2012 | Han ..................... G06F 3/04883 345/173 |
| 8,269,739 B2* | 9/2012 | Hillis et al. .................. 345/173 |
| 8,335,784 B2* | 12/2012 | Gutt et al. .................... 707/722 |
| 8,434,027 B2* | 4/2013 | Jones ........................... 715/848 |
| 8,626,762 B2* | 1/2014 | Seung .................. G06F 3/04883 707/736 |
| 8,672,885 B2* | 3/2014 | Kriesel ................... A61M 5/148 604/131 |
| 8,683,349 B2* | 3/2014 | Roberts ............... G06F 3/04815 715/747 |
| 8,713,011 B2* | 4/2014 | Asai ..................... G01C 21/3611 707/736 |
| 8,730,188 B2* | 5/2014 | Pasquero et al. ............. 345/173 |
| 8,799,777 B1* | 8/2014 | Lee .................... G06F 3/04886 715/702 |
| 8,799,821 B1* | 8/2014 | De Rose ............. G06F 3/04842 715/821 |
| 8,826,170 B1* | 9/2014 | Weber .................. G06F 3/0488 715/777 |
| 8,957,866 B2* | 2/2015 | Barnett ................ G06F 3/0482 345/173 |
| 8,972,898 B2* | 3/2015 | Carter ..................... G06T 15/04 715/757 |
| 9,032,438 B2* | 5/2015 | Ito .......................... G11B 19/02 715/835 |
| 9,239,673 B2* | 1/2016 | Shaffer ................. G06F 3/038 |
| 2001/0024195 A1* | 9/2001 | Hayakawa ................... 345/173 |
| 2002/0140698 A1* | 10/2002 | Robertson .............. G06T 15/20 345/427 |
| 2002/0140736 A1* | 10/2002 | Chen ..................... G06F 3/0481 715/777 |
| 2002/0152222 A1* | 10/2002 | Holbrook ................... 707/104.1 |
| 2003/0085931 A1* | 5/2003 | Card et al. ................... 345/853 |
| 2003/0128242 A1* | 7/2003 | Gordon ........................ 345/848 |
| 2003/0142136 A1* | 7/2003 | Carter ................. G06F 3/04815 715/782 |
| 2003/0149939 A1 | 8/2003 | Hubel et al. ................. 715/526 |
| 2003/0156756 A1* | 8/2003 | Gokturk .................. G06F 3/017 382/190 |
| 2003/0164827 A1* | 9/2003 | Gottesman et al. .......... 345/419 |
| 2003/0174170 A1* | 9/2003 | Jung ..................... G06F 3/0482 715/767 |
| 2004/0027330 A1* | 2/2004 | Bradski ........................ 345/158 |
| 2004/0143598 A1* | 7/2004 | Drucker et al. ........... 707/104.1 |
| 2004/0196267 A1* | 10/2004 | Kawai et al. ................. 345/173 |
| 2004/0257375 A1* | 12/2004 | Cowperthwaite ............ 345/582 |
| 2005/0057530 A1* | 3/2005 | Hinckley et al. ............. 345/173 |
| 2005/0091596 A1* | 4/2005 | Anthony et al. ............. 715/712 |
| 2005/0131924 A1* | 6/2005 | Jones ........................... 707/100 |

(56) References Cited

U.S. PATENT DOCUMENTS

| | | | |
|---|---|---|---|
| 2005/0138570 A1* | 6/2005 | Good | G06F 3/0481 715/789 |
| 2005/0210410 A1* | 9/2005 | Ohwa et al. | 715/821 |
| 2005/0289482 A1* | 12/2005 | Anthony et al. | 715/851 |
| 2006/0022955 A1* | 2/2006 | Kennedy | G06F 3/0414 345/173 |
| 2006/0026535 A1* | 2/2006 | Hotelling | G06F 3/0418 715/863 |
| 2006/0031874 A1* | 2/2006 | Ok et al. | 725/39 |
| 2006/0090022 A1* | 4/2006 | Flynn et al. | 710/105 |
| 2006/0092133 A1* | 5/2006 | Touma et al. | 345/158 |
| 2006/0097991 A1* | 5/2006 | Hotelling | G06F 3/0416 345/173 |
| 2006/0161863 A1* | 7/2006 | Gallo | 715/810 |
| 2006/0164418 A1* | 7/2006 | Hao | G06Q 10/10 345/440 |
| 2006/0212828 A1* | 9/2006 | Yahiro | G06F 3/04815 715/810 |
| 2006/0212833 A1* | 9/2006 | Gallagher et al. | 715/848 |
| 2006/0262116 A1* | 11/2006 | Moshiri et al. | 345/419 |
| 2006/0267966 A1* | 11/2006 | Grossman | G06F 3/0346 345/179 |
| 2007/0024468 A1* | 2/2007 | Quandel | G06Q 40/08 340/968 |
| 2007/0061745 A1* | 3/2007 | Anthony et al. | 715/764 |
| 2007/0070066 A1* | 3/2007 | Bakhash | 345/419 |
| 2007/0091068 A1* | 4/2007 | Liberty | 345/157 |
| 2007/0113207 A1* | 5/2007 | Gritton | 715/863 |
| 2007/0126696 A1* | 6/2007 | Boillot | G06F 3/017 345/156 |
| 2007/0126732 A1* | 6/2007 | Robertson | G06T 15/503 345/419 |
| 2007/0146325 A1* | 6/2007 | Poston | G06F 3/0317 345/163 |
| 2007/0150835 A1* | 6/2007 | Muller | G06F 3/0481 715/810 |
| 2007/0152958 A1* | 7/2007 | Ahn | A63F 9/0842 345/156 |
| 2007/0177803 A1* | 8/2007 | Elias | G06F 3/04883 382/188 |
| 2007/0188518 A1* | 8/2007 | Vale | G06F 3/04883 345/619 |
| 2007/0247425 A1* | 10/2007 | Liberty et al. | 345/158 |
| 2007/0250793 A1* | 10/2007 | Miura et al. | 715/810 |
| 2007/0250794 A1* | 10/2007 | Miura et al. | 715/810 |
| 2007/0256054 A1 | 11/2007 | Byrne et al. | 717/113 |
| 2007/0271532 A1* | 11/2007 | Nguyen | G06F 3/0482 715/854 |
| 2008/0005702 A1* | 1/2008 | Skourup et al. | 715/848 |
| 2008/0016468 A1* | 1/2008 | Chambers et al. | 715/835 |
| 2008/0016471 A1* | 1/2008 | Park | 715/848 |
| 2008/0024454 A1* | 1/2008 | Everest | G06F 3/03547 345/173 |
| 2008/0034013 A1* | 2/2008 | Cisler | G06F 9/4443 |
| 2008/0034317 A1* | 2/2008 | Fard | G06F 3/0481 715/781 |
| 2008/0059915 A1* | 3/2008 | Boillot | G06F 3/0346 715/863 |
| 2008/0062126 A1* | 3/2008 | Algreatly | 345/157 |
| 2008/0062257 A1* | 3/2008 | Corson | 348/47 |
| 2008/0089587 A1* | 4/2008 | Kim et al. | 382/190 |
| 2008/0120568 A1* | 5/2008 | Jian | G06F 3/0346 715/781 |
| 2008/0158145 A1* | 7/2008 | Westerman | G06F 3/0418 345/156 |
| 2008/0158172 A1* | 7/2008 | Hotelling | G06F 1/3231 345/173 |
| 2008/0165140 A1* | 7/2008 | Christie | G06F 3/04883 345/173 |
| 2008/0180406 A1* | 7/2008 | Han et al. | 345/173 |
| 2008/0204424 A1* | 8/2008 | Jin et al. | 345/173 |
| 2008/0225007 A1* | 9/2008 | Nakadaira | G06F 3/04815 345/173 |
| 2008/0276201 A1* | 11/2008 | Risch et al. | 715/853 |
| 2008/0282202 A1* | 11/2008 | Sunday | G06F 3/0483 715/863 |
| 2008/0307361 A1* | 12/2008 | Louch et al. | 715/835 |
| 2008/0309632 A1* | 12/2008 | Westerman | G06F 3/038 345/173 |
| 2009/0021488 A1* | 1/2009 | Kali et al. | 345/173 |
| 2009/0063971 A1* | 3/2009 | White et al. | 715/716 |
| 2009/0077501 A1* | 3/2009 | Partridge et al. | 715/846 |
| 2009/0103780 A1* | 4/2009 | Nishihara et al. | 382/103 |
| 2009/0150775 A1* | 6/2009 | Miyazaki | G06F 3/041 715/702 |
| 2009/0183125 A1* | 7/2009 | Magal | G06F 3/017 715/863 |
| 2009/0184936 A1* | 7/2009 | Algreatly | 345/173 |
| 2009/0204920 A1* | 8/2009 | Beverley et al. | 715/768 |
| 2009/0204928 A1* | 8/2009 | Kallio et al. | 715/799 |
| 2009/0222420 A1* | 9/2009 | Hirata | 707/3 |
| 2009/0237371 A1* | 9/2009 | Kim | G06F 3/0485 345/173 |
| 2009/0237372 A1* | 9/2009 | Kim | G06F 3/044 345/173 |
| 2009/0254869 A1* | 10/2009 | Ludwig | G06F 3/038 715/863 |
| 2009/0265669 A1* | 10/2009 | Kida et al. | 715/863 |
| 2009/0278812 A1* | 11/2009 | Yasutake | G06F 3/04815 345/173 |
| 2009/0282369 A1* | 11/2009 | Jones | 715/848 |
| 2009/0303231 A1* | 12/2009 | Robinet et al. | 345/419 |
| 2009/0313584 A1* | 12/2009 | Kerr | G06F 3/012 715/849 |
| 2009/0313585 A1* | 12/2009 | Hellinger et al. | 715/850 |
| 2009/0315848 A1* | 12/2009 | Ku | G06F 3/0416 345/173 |
| 2009/0322676 A1* | 12/2009 | Kerr et al. | 345/158 |
| 2009/0327969 A1* | 12/2009 | Estrada | 715/848 |
| 2010/0013780 A1* | 1/2010 | Ikeda et al. | 345/173 |
| 2010/0031203 A1* | 2/2010 | Morris | G06F 3/04883 715/863 |
| 2010/0050133 A1* | 2/2010 | Nishihara | G06F 3/0425 715/863 |
| 2010/0053151 A1* | 3/2010 | Marti | G06F 3/011 345/419 |
| 2010/0063813 A1* | 3/2010 | Richter | G06F 3/014 704/231 |
| 2010/0082661 A1* | 4/2010 | Beaudreau | G06F 17/30867 707/769 |
| 2010/0083165 A1* | 4/2010 | Andrews et al. | 715/784 |
| 2010/0095206 A1* | 4/2010 | Kim | 715/702 |
| 2010/0107101 A1* | 4/2010 | Shaw | G06F 3/0481 715/766 |
| 2010/0110025 A1* | 5/2010 | Lim | G06F 3/03547 345/173 |
| 2010/0115428 A1* | 5/2010 | Shuping et al. | 715/760 |
| 2010/0122195 A1* | 5/2010 | Hwang | 715/769 |
| 2010/0153844 A1* | 6/2010 | Hwang | G06F 3/04817 715/702 |
| 2010/0211872 A1* | 8/2010 | Rolston | G06F 3/0482 715/702 |
| 2010/0223574 A1* | 9/2010 | Wang | G06F 3/0485 715/778 |
| 2010/0229130 A1* | 9/2010 | Edge | G06F 3/04883 715/863 |
| 2010/0241955 A1* | 9/2010 | Price | G06F 3/0425 715/702 |
| 2010/0241999 A1* | 9/2010 | Russ | G06F 3/011 715/863 |
| 2010/0257468 A1* | 10/2010 | Bernardo | G06F 3/04815 715/760 |
| 2010/0315413 A1* | 12/2010 | Izadi et al. | 345/419 |
| 2010/0333017 A1* | 12/2010 | Ortiz | 715/800 |
| 2011/0007000 A1* | 1/2011 | Lim | G06F 3/03547 345/173 |
| 2011/0041098 A1* | 2/2011 | Kajiya et al. | 715/849 |
| 2011/0055722 A1* | 3/2011 | Ludwig | G06F 3/04847 715/751 |
| 2011/0093821 A1* | 4/2011 | Wigdor et al. | 715/863 |

(56) References Cited

U.S. PATENT DOCUMENTS

| | | | |
|---|---|---|---|
| 2011/0119629 A1* | 5/2011 | Huotari | G06F 21/36 |
| | | | 715/836 |
| 2011/0145758 A1* | 6/2011 | Rosales | G06F 3/0481 |
| | | | 715/794 |
| 2011/0148798 A1* | 6/2011 | Dahl | 345/173 |
| 2011/0310005 A1* | 12/2011 | Chen et al. | 345/156 |
| 2012/0023471 A1* | 1/2012 | Fischer | G06F 17/5068 |
| | | | 716/115 |
| 2012/0084694 A1* | 4/2012 | Sirpal et al. | 715/769 |
| 2012/0110031 A1* | 5/2012 | Lahcanski | G06F 17/30241 |
| | | | 707/812 |
| 2013/0067411 A1* | 3/2013 | Kataoka et al. | 715/835 |

\* cited by examiner

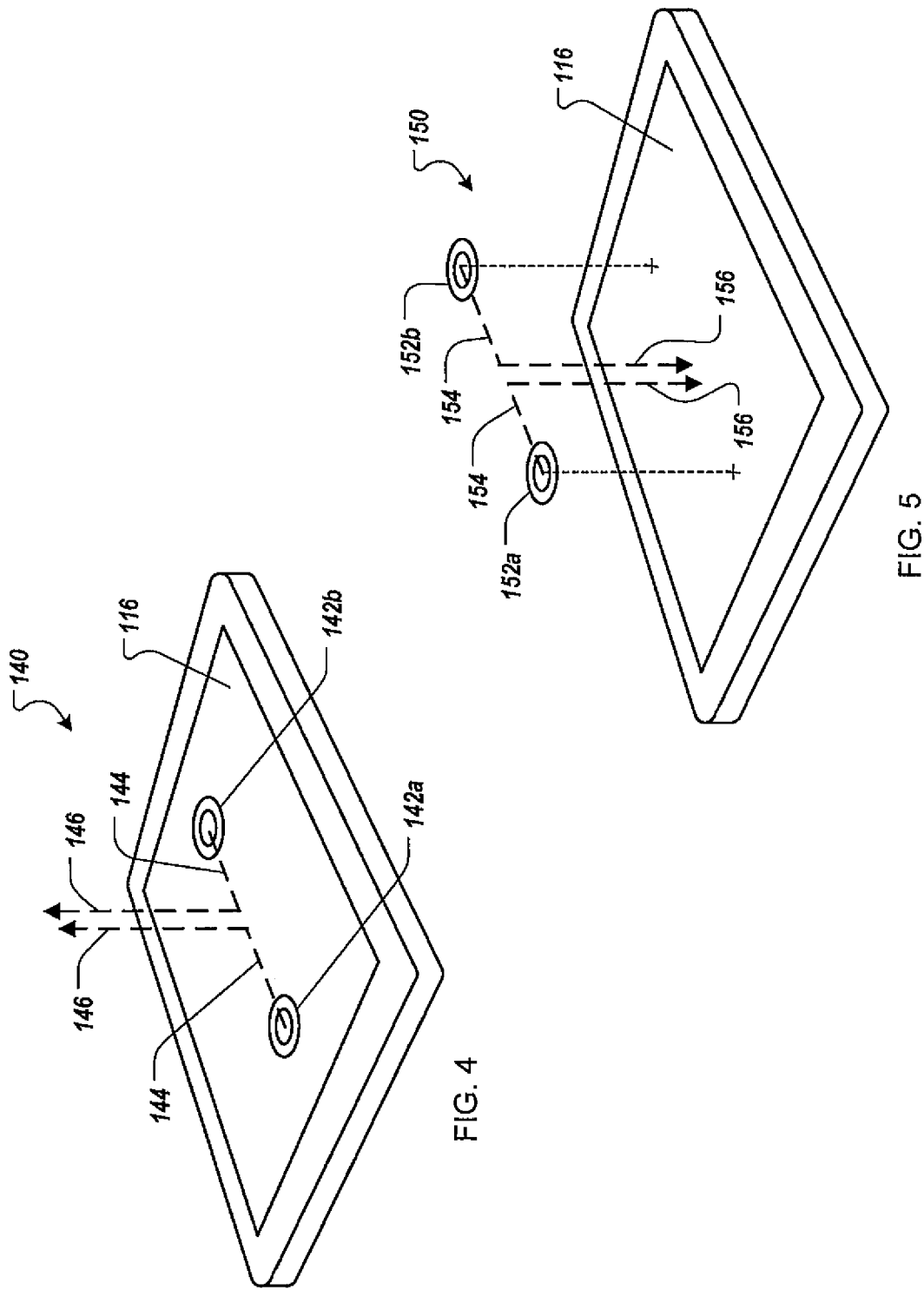

US 10,007,393 B2

3D VIEW OF FILE STRUCTURE

TECHNICAL FIELD

This subject matter is generally related to file structures.

BACKGROUND

Computer operating systems provide software tools to enable users to store, organize, and retrieve files. For example, a file organization tool may allow a user to organize files in a file hierarchy that includes nested folders, in which each folder may include one or more files or subfolders. The file organization tool may present the files in various formats on a display, such as presenting icons that represent the files, or presenting detailed information of various properties of the files, such as names, date modified, sizes, and extension types of the files. When there are many files, a display may not be large enough to show the icons or detailed information of all the files. The file organization tool may show a portion of the files in the display, and provide a scrollbar to allow the user to determine which portions of the files are shown in the display.

SUMMARY

Techniques and systems that support navigation of a file structure or data hierarchy and manipulating objects in the file structure or data hierarchy using three-dimensional (3D) gesture inputs are disclosed. For example, objects can be arranged in a plurality of layers. A user input, including a 3D gesture input having a movement in proximity to a display surface, can be detected. Different layers can be navigated in response to a movement component that is perpendicular to the display surface.

Data hierarchies can be navigated based on 3D gesture inputs. For example, a data hierarchy can be identified, and a user input comprising a 3D gesture input having a movement in proximity to a surface can be detected, in which the movement has a component that is perpendicular to the surface. The data hierarchy can be navigated, or an object in the data hierarchy can be manipulated, based on the user input, in which different levels of the data hierarchy can be navigated based on the movement component that is perpendicular to the surface.

Searching of objects can be implemented based on 3D gesture inputs. For example, a search interface can be provided in which the search interface provides multiple views of search results, each view arranging the search results according to at least one of a plurality of properties. A user input including a 3D gesture input including a movement in proximity to a surface can be detected, in which the movement has a component perpendicular to the surface. Different subgroups of the objects within one of the views can be identified according to the movement component perpendicular to the surface.

An apparatus for navigating layers of objects can include a sensor module to detect 3D gesture inputs, each 3D gesture input including a movement in proximity to a surface and having a component in a direction perpendicular to the surface. A data processor is provided to arrange objects in a plurality of layers, receive signals output from the sensor module, the signals representing detected 3D gesture inputs, and navigate among different layers based on the movement components in a direction perpendicular to the surface.

These features allow a user to quickly and intuitively navigate a file structure having a large number of file objects or a data hierarchy having a large amount of data.

DESCRIPTION OF DRAWINGS

FIGS. 2 to 5 show example 3D gesture inputs.

DETAILED DESCRIPTION

Device Overview

A device having a touch-sensitive display that enables a user to navigate a file structure, navigate a data hierarchy, or search for files or data, using three-dimensional (3D) gesture inputs is disclosed. The device can have touch sensors that can sense positions and movements of objects contacting a surface of the display, and proximity sensors that can sense positions and movements of objects in a 3D space in the vicinity of the display surface (including movements in proximity to, but not actually touching, the display surface). The touch sensors can be sensitive to haptic or tactile contact with a user, and map touch positions and finger movements to predefined touch inputs and two-dimensional (2D) gesture inputs, respectively. The proximity sensors can sense movements of a user's fingers or pointing devices in 3D space, and map the movements to predefined 3D gesture inputs. In some implementations, the touch sensors and the proximity sensors can be the same sensors that detect touch, 2D, or 3D inputs depending on finger movements and positions relative to the display surface. The touch inputs, 2D gesture inputs, and 3D gesture inputs can be used by application programs to trigger events, such as applying certain actions to files or data (for example, selecting, executing, opening, storing, deleting, moving, or modifying the files or data), allowing the user to navigate a file structure or data hierarchy, or search for files, quickly and intuitively.

Figure 1:
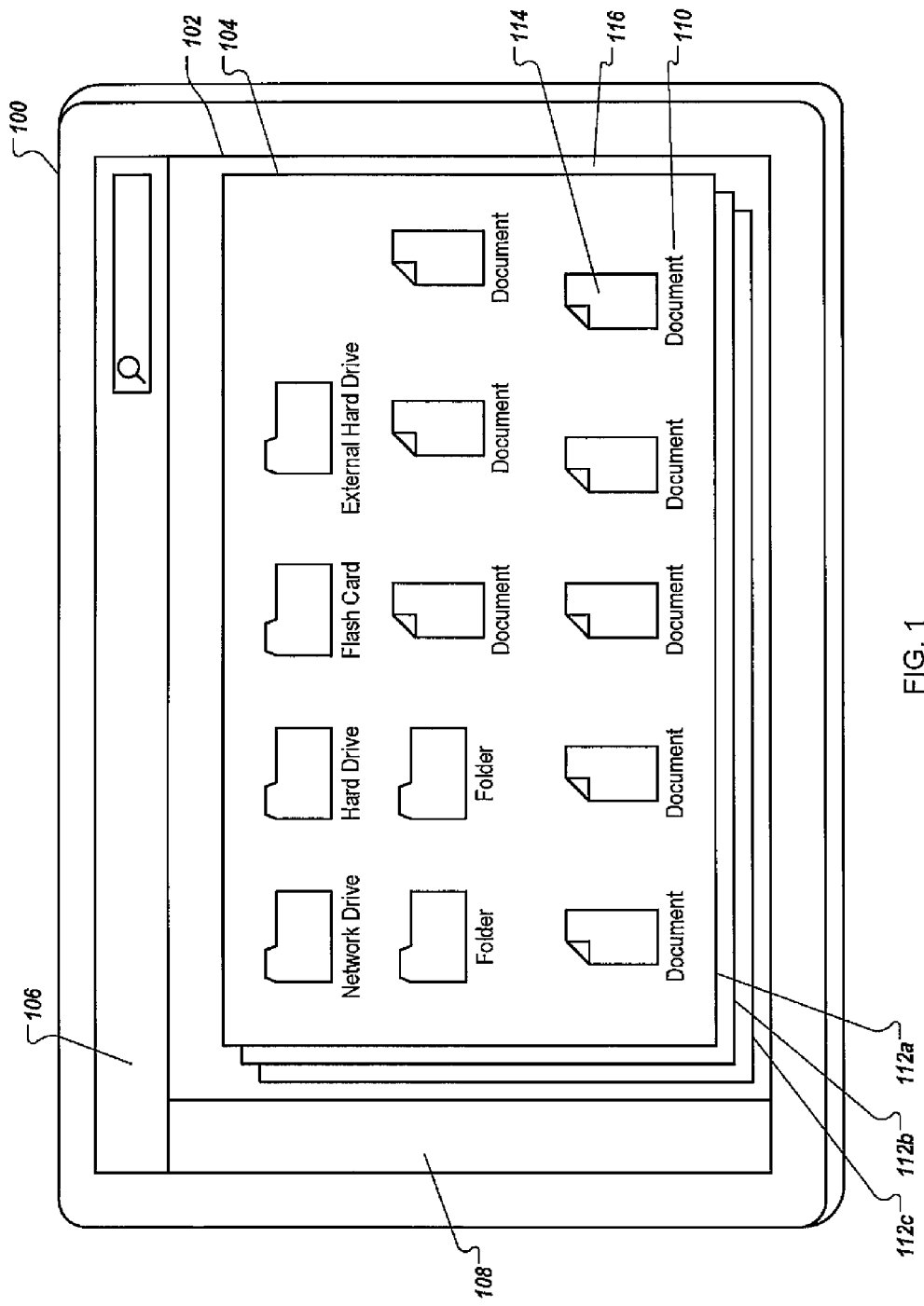
FIG. 1 is a diagram of a device that is responsive to 3D gesture inputs.

Referring to FIG. 1, in some implementations, device 100 can include touch-sensitive display 102 that is responsive to touch inputs, 2D gesture inputs, and 3D gesture inputs. A file organization program (or any application program that accesses files) can be executed on device 100 to enable a user to navigate a file structure or data hierarchy, or search for file objects. For example, the file organization program can provide functions that include a portion of the functions provided by the Finder program, available from Apple Inc., Cupertino, Calif. The file organization program may provide a graphical user interface having file view area 104 for showing representations of file objects 110 or devices storing file objects 110, and menu area 106 having user-selectable menus. Device 100 can be, for example, a computer, a tablet computer, a handheld computer, a personal digital assistant, a cellular telephone, a network appliance, a camera, a smart phone, an enhanced general packet radio service (EGPRS) mobile phone, a network base station, a media player, a navigation device, an email device, a game console, a laptop computer, or a combination of any two or more of these data processing devices or other data processing devices.

The term "file object" refers generally to any application, file, folder, or device for storing the application, file, or folder, such as a built-in storage device of device 100, a removable storage device coupled to device 100, or a shared storage device on a network accessible to device 100.

In some implementations, the user interface may include input area 108 that is logically separated from file view area 104, in which each of areas 104 and 108 can independently receive touch and gesture inputs. Input area 108 can be any region on display 102 that is designated by the operating system or application program to be the input area. By providing input area 108, the user may input two or more multi-touch or gesture inputs at the same time. For example, the left hand may provide one gesture input in input area 108, and the right hand may provide another gesture input in file view area 104. Some gesture inputs may require inputs from both hands, so having a separate input area 108 allows the file organization program to determine whether the movements from multiple fingers correspond to two different gesture inputs or a single gesture input. Additional input areas can be provided, for example, to enable multiple users to process objects simultaneously, with each person possibly providing multiple gestures at the same time.

In the description below, the 3D gesture inputs are described in terms of the movements of the user's fingers. The user can also provide 3D gesture inputs using other pointing devices, such as styluses, or a combination of fingers and pointing devices. For example, the user may use the left hand fingers in combination with a stylus held in the right hand to provide 3D gesture inputs.

Icons 114 representing file objects 110 may be shown in a 3D view, in which the icons are organized in layers, such as layers 112a, 112b, and 112c. The term "layers" refers to logical layers used to group the file objects. When the icons of a layer are presented in a 3D space, the icons do not necessarily have to lie on a "layer" in the 3D space. For example, the icons may be 3D icons that are arranged in a 3D array. In this case, switching from one layer to another involves displaying different 3D arrays of 3D icons. The allocation of a file object to a particular layer can be temporary, and may change as the number of file objects, the sizes of icons 114, and the sizes of windows change. The layers may be opaque, in which only one layer is visible to the user at a time. The layers may also be semi-transparent, in which more than one layer can be visible.

Device 100 is convenient and intuitive to use in navigating a large number of file objects. The user can select file object 110 by providing a touch input that includes touching icon 114 representing file object 110. The user can move file object 110 to a destination folder in the same layer by providing a 2D gesture input that includes sliding icon 114 representing file object 110 to the destination folder. For example, the user can remove file object 110 by providing a flicking gesture input that involves touching file object 100 with a finger to select file object 110, and flicking the finger as if flicking away file object 110.

To view icons 114 of file objects 110 in another layer, the user can provide a 3D gesture input that includes a movement in proximity to display surface 116, the movement having a component that is perpendicular to the display surface, such as moving one or more fingers toward or away from display surface 116.

Navigating File Structures and Data Hierarchies Using 3D Gesture Inputs

Figure 2:
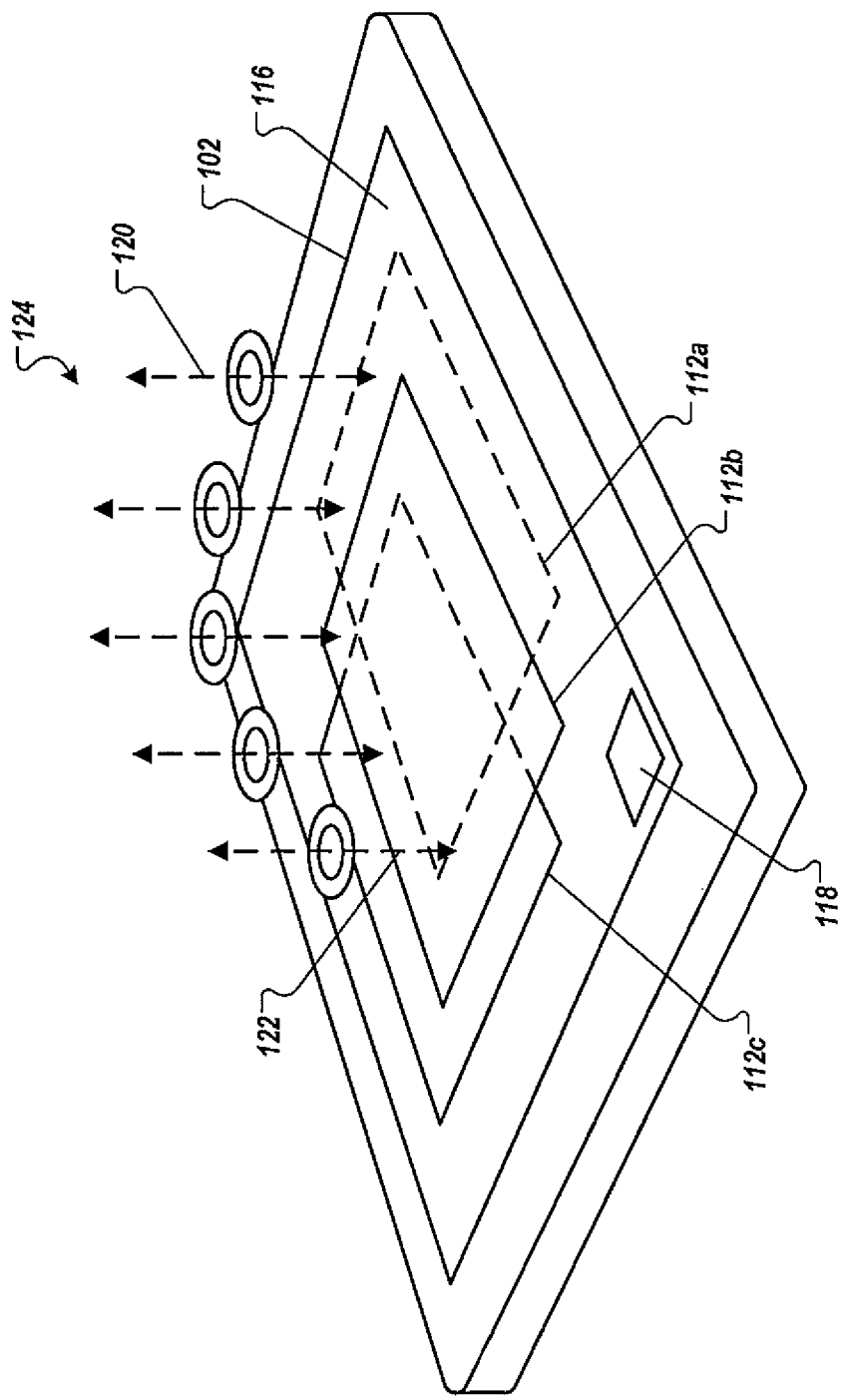

Referring to FIG. 2, for example, the file organization program can be configured to accept 3D gesture input 124 that includes hovering five (or some other number) fingers above display surface 116 for a time period greater than a time threshold (for example, 1 second) to indicate that the user intends to switch layers. The finger tips are represented by concentric circles in the figure. A region 118 in input area 108 can be highlighted to indicate that the file organization program is ready to switch layers according to 3D gesture input 124. The user can move the five fingers up or down at substantially the same time to indicate switching to another layer above or below, respectively, the current layer. The user can abort the switching of layers by, for example, quickly moving the fingers in the horizontal direction, or using other predefined gesture inputs associated with ending of 3D gesture inputs.

For example, suppose there are three layers 112a, 112b, and 112c of file objects 110, and layer 112b is currently visible on display 102. The user can switch from layer 112b to layer 112a by moving 120 the five fingers upward at substantially the same time. Proximity sensors in device 100 can detect the finger movements and provide signals to the file organization program to indicate movements of the fingers. When the file organization program detects that the five fingers have moved upward by a distance equal to or greater than a distance threshold, the file organization program can determine that the user intends to navigate to layer 102a, and renders icons 114 in layer 102a visible. The user can also switch from layer 112b to layer 112c by moving 122 the five fingers downward at substantially the same time. When the file organization program detects that the five fingers have moved downward by a distance equal to or greater than the distance threshold, the file organization program can determine that the user intends to navigate to layer 102c, and renders the icons in layer 102c visible. When the user navigates to a layer, that layer is said to become "active," and will be referred to as the "active layer."

The terms "upward," "downward," "above," "below," "top", "bottom," "vertical," or "horizontal" refer to relative movements or positions of items in the figures, assuming that display surface 116 is parallel to a horizontal plane and facing upwards. The terms are not meant to refer to movements or positions using Earth as a reference. For example, an "upward" movement refers to a movement away from display surface 116 and a "downward" movement refers to a movement toward display surface 116. Hovering a finger "above" a region on display surface 116 means positioning the finger at a distance near the region but not touching the region. Device 100 may be used in various orientations, such that display surface 116 may be facing downwards, so when the finger is said to be hovering above display 102, the finger may actually be positioned below display 102 using Earth as a reference. Similarly, in the examples below, when fingers are said to move upward away from display surface 116, the fingers may actually move downward using earth as a reference.

There may be more than one layer above or below the current layer. When the user moves the fingers upward by a distance that is equal to or more than two or three times the distance threshold, the file organization program may infer that the user intends to navigate to the second or third layer above the current layer, and renders the second or third layer above the current layer visible on display 102. As the user continues to move the fingers upward, the file organization program continues to navigate to upper layers until the top-most layer is reached or when the fingers move beyond the sensor sensing range.

Similarly, when the user moves the fingers downward by a distance that is equal to or more than two or three times the distance threshold, the file organization program may infer that the user intends to navigate to the second or third layer below the current layer, and renders the second or third layer below the current layer visible on display 102. As the user continues to move the fingers downward, the file organization program continues to navigate to lower layers until the bottom-most layer is reached or when the fingers touch display surface 116.

When the user navigates to a particular layer and wishes to remain at that layer, the user can indicate the ending of 3D gesture input 124 by moving the fingers substantially horizontally (i.e., in a direction substantially parallel to display surface 116) in substantially the same direction, or spreading out the fingers in different directions. Other gestures for signaling the ending of 3D gesture input 124 can also be used.

In some implementations, the beginning and ending of each 3D gesture input can be defined by certain actions received in input area 108. For example, touching the input area 108 may indicate the start of a 3D gesture input, maintaining the tactile contact with display surface 116 in input area 108 may indicate continuation of the 3D gesture input, and moving the finger away from the input area 108 may indicate the end of the 3D gesture input. Thus, the user may position five fingers above file view area 104, followed by touching the input area 108 to indicate the beginning of a 3D gesture input for switching to another layer, move the five fingers in the vertical direction, then lift the finger from input area 108 to indicate the ending of the 3D gesture input. By using touch inputs to input area 108 to indicate the beginning and ending of 3D gesture inputs, the user can initiate switching of the layers faster, since the fingers do not have to hover above file view area 104 for more than the time threshold to initiate the switching.

In some implementations, the user can provide a touch input by touching a designated region (for example, region 118) in input area 108 to indicate that the user intends to switch layers. After region 118 is touched, any finger movement in proximity of display surface 116 will be interpreted as indication of switching of layers. The user may move one or more fingers upwards to switch to a layer above the current layer, or move one or more fingers downwards to switch to a layer below the current layer. The user can remove the touch input from region 118 to indicate that the user intends to remain at the current layer. By using touch inputs to designated region 118 to indicate whether switching of layers is intended, not only can the user initiate switching of layers faster, the user can also have more flexibility in the 3D gesture input, since the user can move just one finger (instead of five fingers) above display surface 116 in the vertical direction to control navigation of the layers.

In some implementations, an application program (for example, a file organization program) can configure a touch model in the system so that 3D gestures can be detected. The touch model can have an Application Programming Interface (API) that can be used by the application to receive 2D or 3D touch events and use those touch events to perform actions, such as selecting, opening, moving, or deleting file objects.

Figure 3:
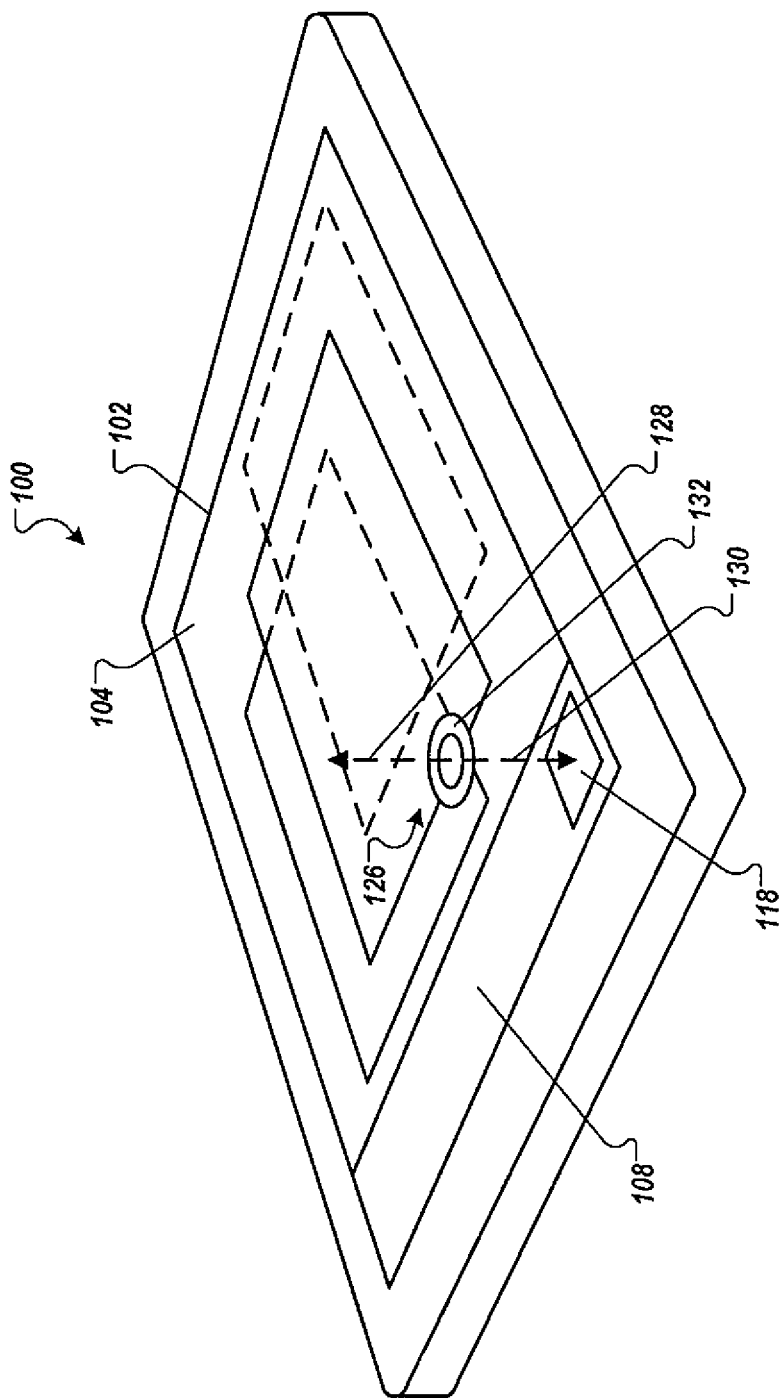

Referring to FIG. 3, in some implementations, the user can provide 3D gesture input 126 in proximity to region 118 to control switching of layers. For example, when the user hovers one (or some other number) finger 132 above region 118 for more than a time threshold (for example, 1 second), region 118 is highlighted, indicating that the file organization program is ready to switch layers according to 3D gesture input 126. If the user moves 128 finger 132 upwards by a distance equal to or more than the distance threshold, the file organization program navigates to a layer above the current layer. If the user moves 130 finger 132 downwards by a distance equal to or more than the distance threshold, the file organization program navigates to a layer below the current layer.

In this example, the user can use a left-hand finger to control navigation among different layers, and use right-hand fingers to provide touch inputs, 2D gesture inputs, or 3D gesture inputs to navigate within the active layer or process file objects in the active layer, such as selecting, deleting, moving, or executing the file objects.

In some implementations, the distance threshold that is used by the file organization tool for determining whether the user intends to switch from one layer to another layer can be adjusted by the user. For example, the user can set the distance threshold to be 0.5 cm, such that the file organization program navigates to a different layer if the fingers move upward or downward by 0.5 cm or more.

The user can set the distance threshold by, for example, entering a numerical value, adjusting a slide bar, or using a 2D or 3D gesture input. For example, the user may provide a 3D gesture input by hovering a finger above a designated region in input area 108, and pulling the finger up or down to increase or decrease, respectively, the distance threshold. For example, the user may provide a 2D gesture input by touching two fingers on display surface 116, and sliding the two fingers toward or away from each other to decrease or increase, respectively, the distance threshold.

In some implementations, the distance threshold can be dynamically adjusted according to the number of layers. If there are more layers, the file organization program sets the distance threshold smaller so that the user can switch to any one of the layers in one upward or downward movement. If there are fewer layers, the file organization program sets the distance threshold larger to provide a greater margin of error so that the user can more accurately control which layer to switch to.

In some implementations, the distance threshold can be set based on a combination of user-selectable values and dynamic adjustments made according to the number of layers. For example, the file organization program can change the user-defined distance threshold by up to a certain amount depending on the number of layers based on a formula. If there are five layers or less, the file organization program does not change the user-defined distance threshold. If there are six or seven layers, the file organization program reduces the user-defined distance threshold by about 10%. If there are eight or nine layers, the file organization program can reduce the user-defined distance threshold by about 20%, and so forth. The file organization program may set a maximum reduction of about 50% so that device 100 does not become too sensitive to finger movements, making it difficult to accurately select a particular layer. Other formulas for setting the distance threshold can also be used.

The distance threshold determines the sensitivity to the user's vertical finger movements. The distance threshold can be set as a system global parameter such that all application programs executing on device 100 use the same distance threshold. The user may also adjust the distance threshold for each individual application program, or for different categories of uses within the same application program.

The file organization program may provide an option for the user to set a skip parameter that determines the number of layers to skip each time the finger(s) move a distance equal to the distance threshold. For example, if there are many layers, the file organization program may skip two or more layers at a time for each finger movement that equals the distance threshold. The skip parameter may be set by, for example, entering a numerical value, adjusting a slide bar, or using a 2D or 3D gesture input.

Referring to FIG. 4, in some implementations, device 100 may be configured to accept "pinch-and-pull" 3D gesture input 140 to navigate to a layer that is higher than the current layer. Pinch-and-pull 3D gesture input 140 may be defined by a sequence of finger movements. For example, the user can touch display surface 116 at two touch points 142a and 142b, slide 144 the two fingers toward each other across display surface 116 as if pinching an object, and pull up 146 the two fingers substantially perpendicular to surface 116. If there are several layers above the current layer, the file organization program may sequentially navigate to each layer above the current layer as the fingers move upwards.

In some implementations, the user can also provide pinch-and-pull gesture input 140 by hovering two fingers above display surface 116, moving the two fingers toward each other in substantially horizontal motions as if pinching an object, and pulling up the two fingers substantially perpendicular to display surface 116.

Referring to FIG. 5, in some implementations, device 100 may be configured to accept "pinch-and-push" 3D gesture input 150 to navigate to a layer that is lower than the current layer. Pinch-and-push 3D gesture input 150 may be defined by a sequence of finger movements. The user can hover two fingertips 152a and 152b above display surface 116, move 154 two fingers toward each other in substantially horizontal motions as if pinching an object, and push down 156 the two fingers substantially perpendicular to surface 116. If there are several layers below the current layer, the file organization program may sequentially navigate to each layer below the current layer as the fingers move downwards.

The file organization program may be configured to accept 3D gesture inputs for coarse navigation and fine navigation. For example, in pinch-and-pull gesture 140, if the user pinches two fingers together before pulling up, the 3D gesture may indicate fine navigation in which each layer is visited as the fingers are pulled up. If the user moves the two fingers toward each other but the two fingers do not touch each other, and the two fingers remain spaced apart a small distance while being pulled up, the 3D gesture may indicate coarse navigation in which the file organization program skips two or more layers at a time for each upward finger movement that equals the distance threshold.

Similarly, in pinch-and-push gesture 150, if the user pinches two fingers together before pushing down, the 3D gesture may indicate fine navigation in which each layer is visited as the fingers are pushed down. If the user moves the two fingers toward each other but the two fingers do not touch each other, and the two fingers remain spaced apart a small distance while being pushed down, the 3D gesture may indicate coarse navigation in which the file organization program skips two or more layers at a time for each downward finger movement that equals the distance threshold.

Pinch-and-pull 3D gesture input 140 and pinch-and-push 3D gesture input 150 can be applied to file view area 104 to navigate among different layers. By accepting 3D gesture inputs for navigating among different layers directly in the file view area 104, the file organization program allows the user to access a large number of files quickly and conveniently.

For example, suppose the user wants to select images files from a folder that has more than a thousand image files, and the size of the image file icons and the screen window size are configured such that less than ten percent of the images can be shown in the screen window at any given time. In this example, the file organization program can arrange the image file icons in more than ten layers. The user can tap the image file icons to select the image files in each layer, and sequentially navigate the various layers using 3D gesture inputs. If the user uses one hand to select the image files and navigate among various layers, the user's hand movements in the horizontal direction mainly relates to moving from one icon to another when the icons are shown on different regions of the display.

By comparison, if the image files are all arranged in a single layer, and a scrollbar is provided at an edge of the screen window to allow the user to scroll the space in the window to view different image files, the user may have to move the hand back and forth between the image file icons and the edge of the window. Such back and forth horizontal hand movement may be inconvenient, particularly if the screen size is large.

A scrollbar takes up a certain amount of screen space, so removing the scrollbar also has the benefit of increasing the screen space available for displaying the file objects. This is useful when the screen size is small, such as when display 102 is part of a portable device, such as a mobile phone, personal digital assistant, game console, or digital camera.

Using 3D gesture inputs may involve a smaller amount of hand movement for navigating the files, as compared to using a scrollbar. For example, suppose the files are sorted in a certain order, and the user wants to select the first few files and the last few files. The hand movement(s) in the 3D gesture input(s) used to navigate from the first layer (where the first few files are located) to the last layer (where the last few files are located) may be smaller than the hand movement needed to move the bar from one end to another end of the track of the scrollbar. Thus, using 3D gesture inputs applied directly to file view area 104 to navigate a file structure may reduce the amount of hand movements (as compared to using a scrollbar), reduce user fatigue, and increase user productivity.

In the example where a scrollbar is used, if accessing a file involves merely tapping the file icon, the user may use one hand to operate the scrollbar and use the other hand to tap the image file icons. However, there are occasions when both hands may not be available, such as when one hand is used to hold device 100, or when the user wishes to perform operations on selected files that need gesture inputs involving both hands. Thus, navigating file structures using 3D gesture inputs is a useful alternative to the use of scrollbars.

Using 3D gesture inputs to navigate a file structure may also be useful when a file directory has many folders, and each folder has many subfolders. Each folder may have several file objects that are organized in layers. Navigating several levels deep in the directory may involve using a 3D gesture input to navigate to a particular layer in the first level of the directory, double tapping a folder icon to open the folder, providing another 3D gesture input to navigate to a particular layer in the second level of the directory, double tapping another folder icon to open the folder, and so forth. This may be more convenient than moving the hand to the edge of the window to adjust a scrollbar to find a folder in the first level of the directory, moving the hand across display surface 116 to the location of a folder icon to double tap the folder icon to open the folder, moving the hand across display surface 116 to the edge of the window to adjust a scrollbar to find another folder in the second level of the directory, moving the hand to the location of a folder icon to double tap the folder icon to open the folder, and so forth.

In the example of FIG. 1, the layers 112*a*, 112*b*, and 112*c* are shown stacked one above the other. The active layer may also be configured to occupy the entire file view area 104, or the entire display 102. In the example of FIG. 1, each layer is shown to have several file objects. It is also possible to show a single file object in each layer. Rather than just showing an icon, the icon itself may show the content of the file object, such as text, image, or video. By showing one object in each layer, the user can quickly examine all the objects in the layer using 3D gesture inputs.

For example, a folder may include images of slices of an object, such as images obtained from a computerized tomography (CT) or magnetic resonance imaging (MRI) scan. Each image file may correspond to a slice of the object at a particular depth. The image files may be presented in layers and sorted according to the depths of the slices represented by the images, such that the image file in the top layer corresponds to the top slice of the object, and the image file in the bottom layer corresponds to the bottom slice of the object. By using 3D gesture inputs, the user can quickly examine all the slices of the object. The user may annotate images, such as by circling portions the images. After annotating an image, the user can move to the next image using a 3D gesture input that involves moving fingers up or down, and does not require the user to move the hand to an edge of the screen window to operate a scrollbar or to click a button.

Similarly, using the technique described above, the user can navigate among data files to quickly view changes or trends in the data. For example, a folder may include image files each representing a map of the population density of a country at a particular year. By sorting the files according to the year represented by the files, the user can use 3D gesture inputs to move from one image to another to see trends in the change of population. There are alternative ways to switch from one image to another, such as using a slideshow function, clicking on a "next" button, or adjusting a scrollbar. In some examples, using the 3D gesture inputs to navigate the image files may be more convenient than other methods.

In some implementations, device 100 may provide a search interface or search tool that allows users to search for file objects, either stored in device 100 or in an external storage accessible to device 100. The file objects can include, for example, application programs, files, and electronic mail and messages, and devices for storing the above. For example, the search tool may be part of the file organization program.

The file objects may have various properties, for example, name, size, created date, modified date, file extension type, sent time, received time, subject line, attachment, and/or priority. The search tool can provides multiple views of search results, each view arranging the search results according to at least one of the properties. For example, one view may sort the names of the file objects resulting from the search according to alphabetical and numerical order, another view may sort the file objects according to file size, and another view may sort the file objects according to the dates that the files are modified.

The user may switch among various views and operate on the file objects in each view. For example, the user may search for files related to a project identified by a code name "k1." There may be hundreds of file objects related to the project, such as program files, libraries, and various versions of the program files and libraries modified on different dates. The user may want to see the file objects sorted by date and time, process some of the files (for example, delete some of the older versions), then see the file objects sorted by file name, and so forth.

For example, the user may want to see the file objects that were modified on the same date as a particular file. In this case, the user may select a view that sorts the search results according to file name, select a particular file, then switch to another view that sorts the search results according to date in order to see other files that were modified on the same date or nearby dates.

As another example, electronic mail may have properties such as received date, name of sender, name of recipient, subject line, priority, and file size. The user may want to find e-mail items received on the same date as a particular e-mail sent by a particular person. The user may select a view that sorts the e-mail items according to sender names, select the particular e-mail sent by the particular person, then switch to another view that sorts the e-mail items according to date to see other e-mail items received on the same date or nearby dates.

Figure 6:
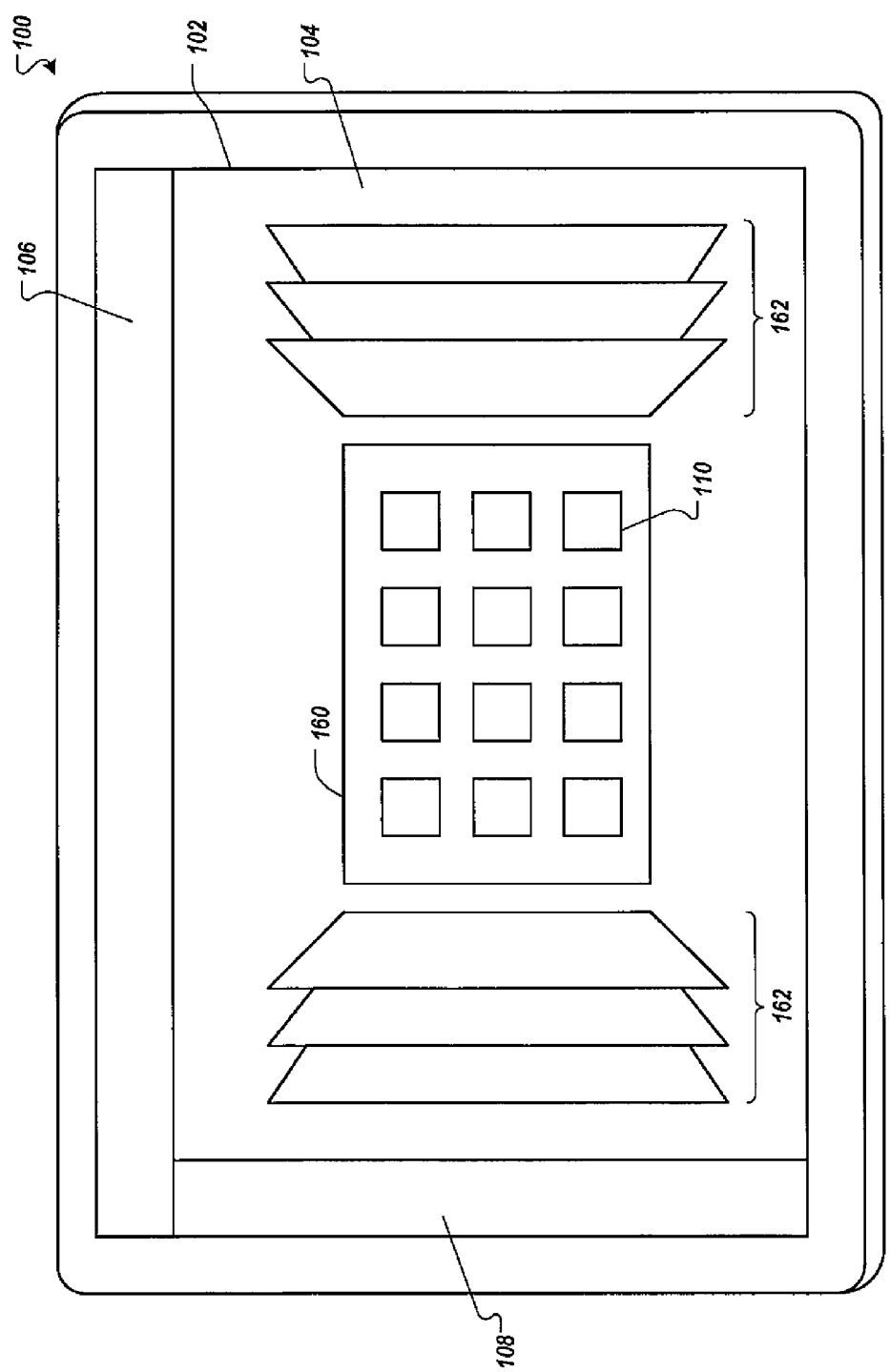
FIGS. 6 and 7 show example search interfaces having multiple views of search results.

Referring to FIG. 6, in some implementations, the search tool may present each view of the search results in a separate window, and arrange the windows in a virtual 3D space. For example, the search tool may show one of the views (for example, view 160) prominently in the center of file view area 104, while the other views (for example, views 162) may be tilted and stacked up near the sides of file view area 104. Each view may include many file objects 110. The search tool may accept 2D or 3D gesture inputs to allow the user to switch among various views. For example, the search tool may recognize a swipe gesture that "sweeps" out one view, replacing it by another view.

Figure 7:
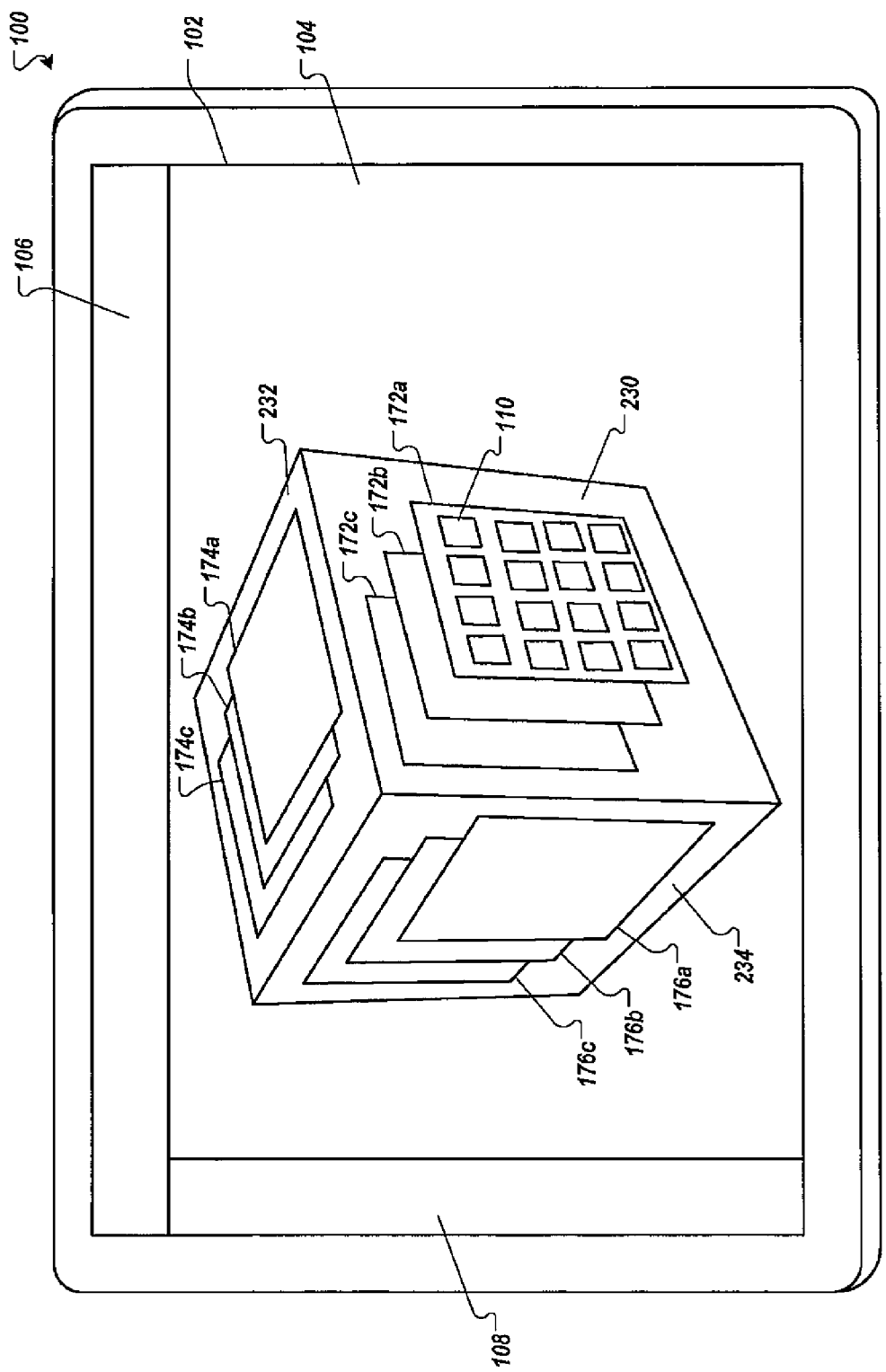

Referring to FIG. 7, in some implementations, the search tool may present six views (including, for example, views 230, 232, and 234) of the search results on six faces of cube 170. Each view may include many file objects 110. The search tool may accept 2D or 3D gesture inputs for rotating cube 170 in order to show the various views.

Once a view is selected, the user can use 3D gesture inputs, such as those described above, to navigate within the view. For example, on each face of the cube, the search tool may present the file objects in layers (for example, 172*a*, 172*b*, 172*c*, 174*a*, 174*b*, 174*c*, 176*a*, 176*b*, 176*c*), and the user can navigate among the layers using 3D gesture inputs. Upon navigating to a layer, the user may use gesture inputs to select and process file objects.

In the example above where the user searches for file objects related to the k1 project, the user may use a gesture input to select a view to see file objects sorted by date and time, use a 3D gesture input to navigate among layers of file objects, use the flicking gestures to delete some of the older versions of program files, then use a gesture input to switch to another view to see the file objects sorted by file name, and so forth.

In the example above where the user searches for e-mail received on the same date as a particular e-mail sent by a particular person, the user may use a gesture input to select a view to see e-mail sorted according to sender names, use a 3D gesture input to navigate various layers of e-mail items, select the particular e-mail sent by the particular person, then use a gesture input to switch to another view to see the e-mail items sorted according to date, and so forth.

This way, switching among various views, searching for particular file objects within a view, and processing the file object can be done using gesture inputs applied directly in the file view area 104. This may be more convenient than using a scrollbar in each view, which may require more hand movements.

In some implementations, applying pinch-and-pull gesture input 140 or pinch- and push gesture input 150 above a blank space in the window allows the user to navigate to a different layer, and applying pinch-and-pull gesture input 140 or pinch-and push gesture input 150 above an icon of a file object in the window allows the user to move the file object to a different layer. For example, the user may "pinch" a file object with two fingers to select the file object, then pull up or push down the fingers to move the selected file object to another layer, then separate the two fingers to "release" the file object either in the other layer (if the file object is released above a blank space in the other layer) or in another file object in the other layer (if the file object is released above another icon in the other layer).

In some implementations, there may be other 3D gesture inputs or variations of the 3D gesture inputs described above. For example, the file organization program can provide an "invert" option such that pinch-and-pull gesture 140 shown in FIG. 4 can be used to navigate to a layer below the current layer. For example, the user may touch a designated region in input area 108 to select the invert option. This may be useful for users who find pinch-and-pull gesture 140 more convenient than pinch-and-push gesture 150 (shown in FIG. 5), which may sometimes cause fingers to bump into the display screen.

The file organization program may show all the layers as a stack, and provide a pointer to show which layer the user has navigated to without actually showing the icons of the file objects in the layer while the user is still navigating among the layers. The file organization program may show the icons of the file objects in a layer upon receiving confirmation that the user intends to make the layer active.

In some implementations, file objects in device 100 may be organized in a file hierarchy having several levels, and the 3D gesture inputs can be used to navigate various levels of the file hierarchy. For example, a file hierarchy may include several levels of nested folders. The pinch-and-pull gesture input can be used to navigate to a level higher than the current level, and the pinch-and-push can be used to navigate to a level lower than the current level. Gesture inputs that include movements parallel to display surface 116 may be used to navigate within any given level in the file hierarchy.

The 3D gesture inputs may be used to navigate the various data hierarchy. For example, map data having various resolutions can be arranged in a hierarchy, in which the top level map data has the coarsest resolution, and the bottom level map data has the finest resolution. A map application can be configured to accept 3D gesture inputs for zooming in or out of a map. For example, pinch-and-pull gesture input 140 may represent an instruction for zooming out a map to render the map at a coarser scale, and pinch-and-push gesture input 150 may represent an instruction for zooming in a map to render the map at a finer scale.

For example, timeline data having various resolutions can be arranged in a hierarchy, in which the top level timeline data has the coarsest resolution, and the bottom level timeline data has the finest resolution. A timeline application can be configured to accept 3D gesture inputs for zooming in or out of a timeline. For example, pinch-and-pull gesture input 140 may represent an instruction for zooming out a timeline to render the timeline at a coarser scale, and pinch-and-push gesture input 150 may represent an instruction for zooming in a timeline to render the timeline at a finer scale.

Voice commands can be used in parallel to touch and gesture inputs. The user can provide voice commands such as "start" and "end" to indicate the start and end, respectively, of a gesture input.

The touch inputs, 2D gesture inputs, and 3D gesture inputs for navigating a file structure, file hierarchy, or data hierarchy can be used in applications other than file organization programs. For example, many application programs can store and retrieve files. When the user of an application program intends to store or retrieve a file, the user may navigate directories to determine which location to store the file or find the location where the file is stored. The touch and gesture inputs described above can be useful in navigating the file directories.

The touch and gesture inputs described above can be useful in switching between any types of layers or objects. For example, an operating system may allow several application programs to be executed at the same time. In some examples, a taskbar or dock is provided to show icons of applications that are currently executing, and the user can click on the icons to switch to the application programs. When an application program is executing in the full screen mode, the taskbar or dock may not be visible. The user may have to move a pointer to an edge to the screen to cause the taskbar or dock to temporarily appear, or exit the full screen mode to cause the taskbar or dock to appear. In some examples, keystroke shortcuts can be used to switch from one application to another. In a device where it may not be convenient to use keystrokes, such as when the device does not have a physical keyboard, the user can use the touch and gesture inputs (for example, the pinch-and-pull or pinch-and-push gesture inputs) described above to switch among application programs without exiting the full screen mode.

A web browser program may allow the user to open several web pages using several tabs. The touch and gesture inputs described above can be used to switch from one tab to another. For example, the user may view a web page in full screen mode, and switch to another web page using the 3D gesture inputs described above.

An application program may allow the user to work on several files at the same time. For example, a word processing program may allow the user to open several files and switch among various files by clicking on icons on the taskbar or dock, or selecting one of the files from a drop-down menu within the word processing program. In some implementations, the user can use the 3D gesture inputs described above to switch from one file to another file within the word processing program. Similarly, the user can use the 3D gesture inputs described above to switch from one file to another file within other application programs, such as CAD programs, document viewing programs, spreadsheet programs, electronic mail or message programs, video conferencing programs, video editing programs, and audio editing programs.

For example, 3D gesture inputs can be different from those described above. Additional 3D gesture inputs can be defined for navigating a file structure or a data hierarchy in additional ways. For example, the pinching motion in the pinch-and-pull or pinch-and-push gesture inputs can be modified by moving three, four, or five fingers together and pulling up or pushing down the fingers to cause the file organization program to skip two or more layers at a time, allowing the user to navigate the layers faster.

In the description above, the touch inputs, 2D gesture inputs, and 3D gesture inputs are detected by touch sensors and proximity sensors embedded in display 102. In some implementations, the touch sensors and proximity sensors can be a single sensor, such as a capacitive touch sensor. In some implementations, the capacitive touch sensor can detect a capacitance that is approximately inversely proportional to (or have some other predetermined relationship with) the distance between the finger and a surface (e.g., display surface 116 or another surface). The change in capacitance detected can be sent to the touch model configured for 3D mode and the 3D gesture can be determined based on the value of the capacitance, e.g., in addition to other parameters that are used for 2D touch models. The finger capacitance acts as one plate of the capacitor and the surface is the other plate. The capacitance is inversely proportional to the distance between the finger and the surface, so as the user moves the finger vertically above the touch surface the capacitance decreases. This can allow a 3D touch model to interpret the distance d of the finger above the touch surface and select the appropriate 3D touch event based on the value of the capacitance. The capacitance can be detected by the capacitive touch sensor and sent to the touch model. If the capacitance is lower than the capacitance at a reference position, then a 3D touch event has occurred. The reference capacitance can be the capacitance when the finger is touching the surface. Processor can detect the reference capacitance, and a drop in capacitance signals a 3D touch event.

The touch inputs, 2D gesture inputs, and 3D gesture inputs can also be provided to a touch-sensitive surface, such as a trackpad or touchpad, in which touch sensors and proximity sensors are embedded in the trackpad or touchpad. The touch-sensitive surface can be integrated with device 100 or be coupled to device 100 through a wired or wireless connection. The touch inputs, 2D gesture inputs, and 3D gesture inputs can also be provided to a surface of a touch-sensitive computer mouse, in which touch sensors and proximity sensors are embedded in the computer mouse. The gesture inputs for navigating the file structures and data hierarchies described above can also be applied to these touch-sensitive surfaces.

In some implementations, display 102 can be a 3D display that can show 3D images to the user. The 3D display can be an autostereoscopic display that uses lenticular lenses or parallax barriers. The 3D display can provide images having different polarizations intended for left or right eyes, and can be viewed by users wearing polarized 3D glasses. The 3D display can be a volumetric 3D display. The surface display 102 can be non-planar, such as dome shaped or cylindrical. The touch sensors and proximity sensors embedded in the display can conform to the exterior shape of the display surface. For example, display 102 can show 3D images of the layers of file objects, and the user can apply 3D gesture inputs in which the user's fingers appear as if touching the layers or 3D file objects.

Processes for Navigating File Structures and Data Hierarchies

Figure 8:
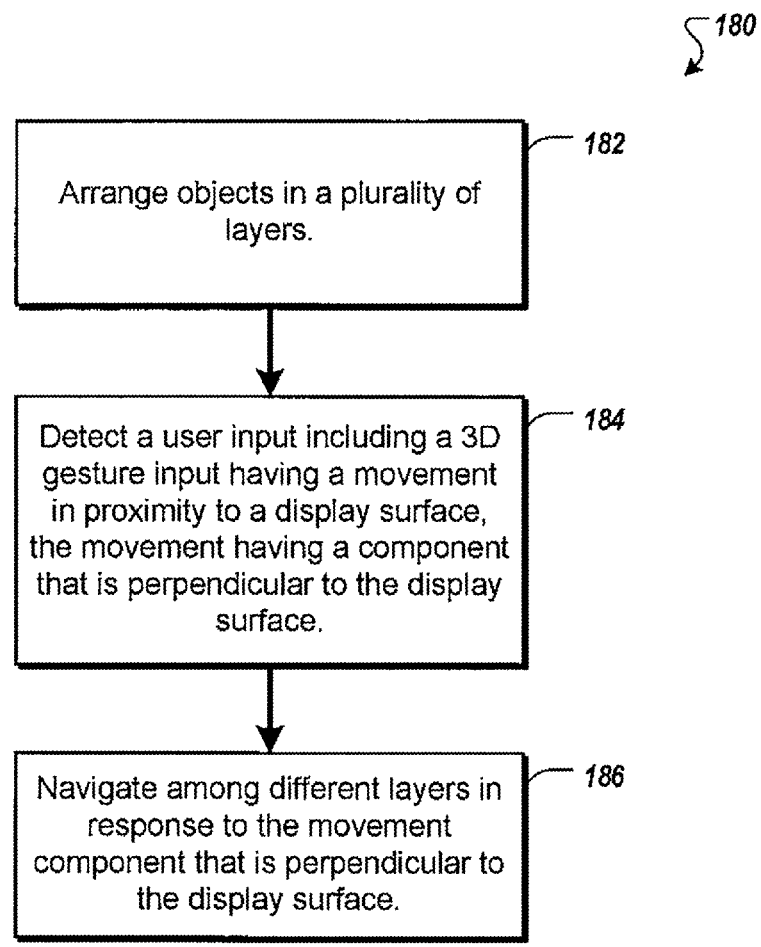
FIGS. 8 to 10 are exemplary flow diagrams according to various embodiments of the invention.

FIG. 8 is a flow diagram of example process 180 for navigating layers of objects. For example, process 180 can be implemented using device 100. In process 180, objects are arranged in a plurality of layers (182). For example, the objects can be file objects, such as files or folders.

A user input, including a 3D gesture input having a movement in proximity to a display surface, can be detected (184). The movement can have a component that is perpendicular to the display surface. For example, the display surface can be display surface 116. The 3D gesture input can include pulling up or pushing down the finger(s) as shown in FIGS. 3, 4, and 5.

Process 180 includes navigating (186) among different layers in response to the movement component that is perpendicular to the display surface. For example, the user can navigate from layer 112b to layer 112a in response to a pinch-and-pull gesture input, or from layer 112b to layer 112c in response to a pinch-and-push gesture input.

Figure 9:
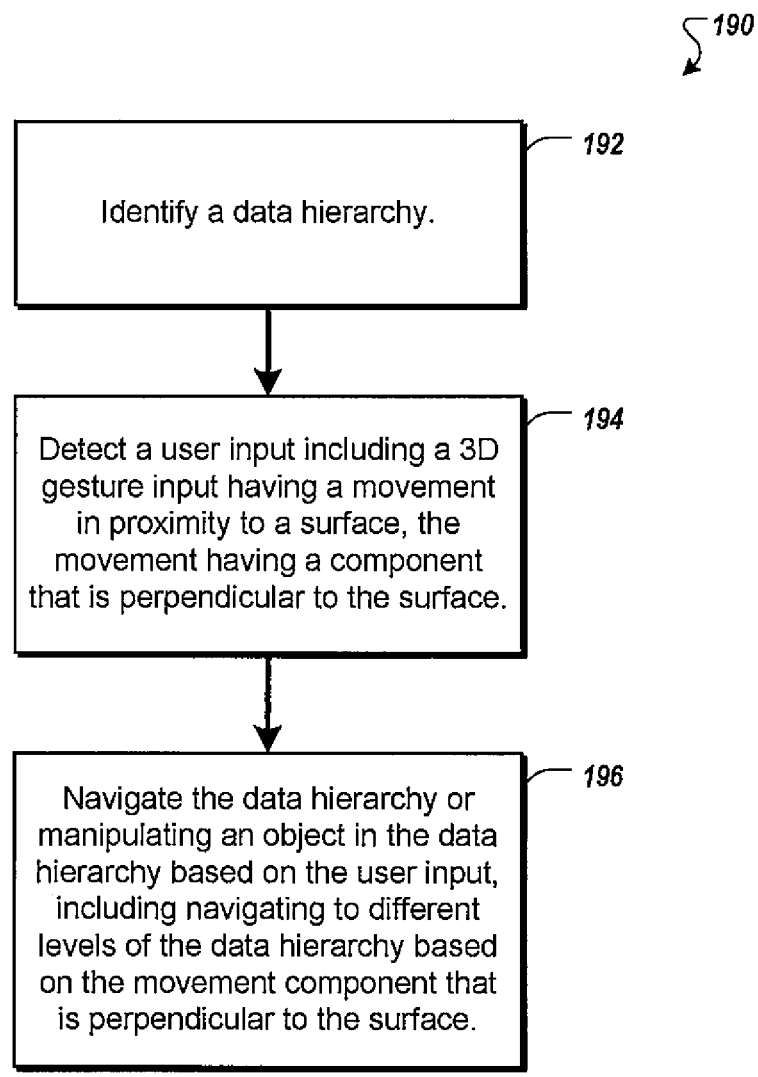

FIG. 9 is a flow diagram of example process 190 for navigating a data hierarchy. For example, process 180 can be implemented using device 100. In process 190, a data hierarchy is identified (182). For example, the data hierarchy can include several levels of nested folders.

A user input including a 3D gesture input having a movement in proximity to a surface is detected (194), in which the movement has a component that is perpendicular to the surface. For example, the display surface can be display surface 116. The 3D gesture input can include pulling up or pushing down the finger(s) as shown in FIGS. 3, 4, and 5.

Process 190 includes navigating (196) the data hierarchy or manipulating an object in the data hierarchy based on the user input, including navigating to different levels of the data hierarchy based on the movement component that is perpendicular to the surface. For example, the user can navigate to a level higher than the current level in the hierarchy in response to a pinch-and-pull gesture input, or to a layer lower than the current level in the hierarchy in response to a pinch-and-push gesture input.

Figure 10:
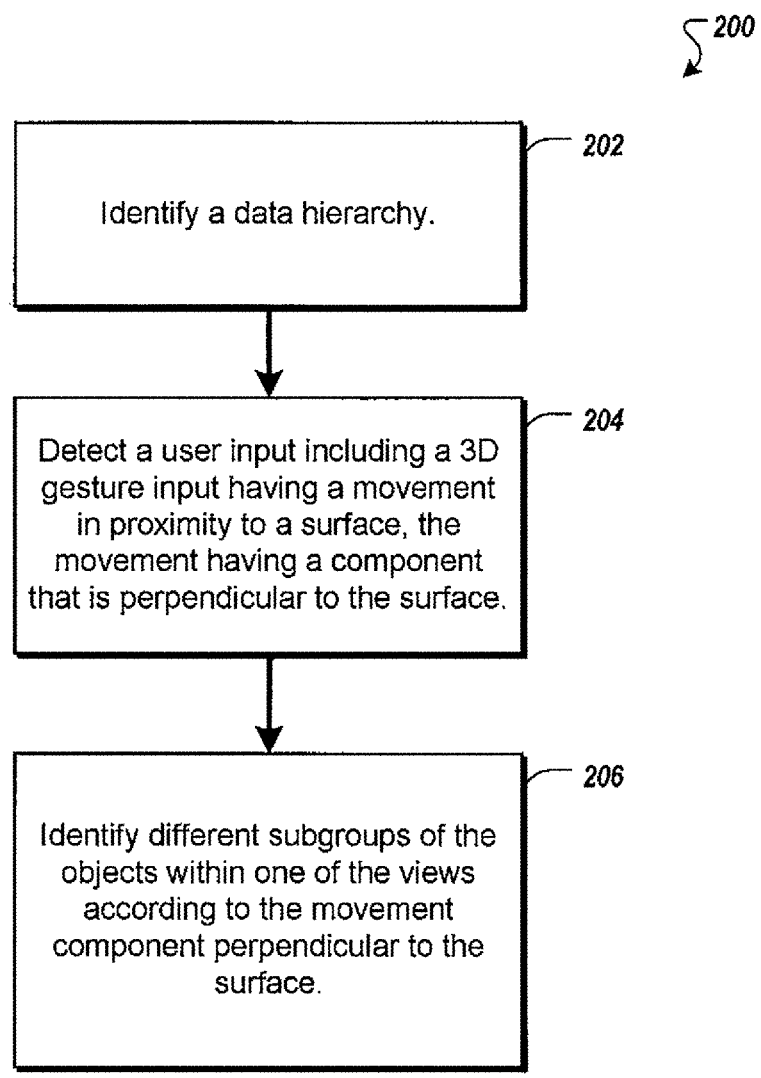

FIG. 10 is a flow diagram of example process 200 for searching objects. For example, process 200 can be implemented using device 100. In process 200, a search interface is provided (202), in which the search interface provides multiple views of search results, each view arranging the search results according to at least one of a plurality of properties. For example, the search interface can provide multiple views, such as views 160 and 162 in FIG. 6, or views 230, 232, and 234 of FIG. 7.

A user input including a 3D gesture input, including a movement in proximity to a surface, can be detected (204). The movement can have a component perpendicular to the surface. For example, the surface can be display surface 116, and the 3D gesture input can include finger movements such as those shown in FIGS. 2 to 5.

Different subgroups of the objects within one of the views are identified according to the movement component perpendicular to the surface (206). For example, within view 230 in FIG. 7, the user can identify file objects 110 in different layers 172a to 172c according to pulling up or pushing down movements in the pinch-and-pull or pinch-and-push gesture inputs.

Example Software Architecture

Figure 11:
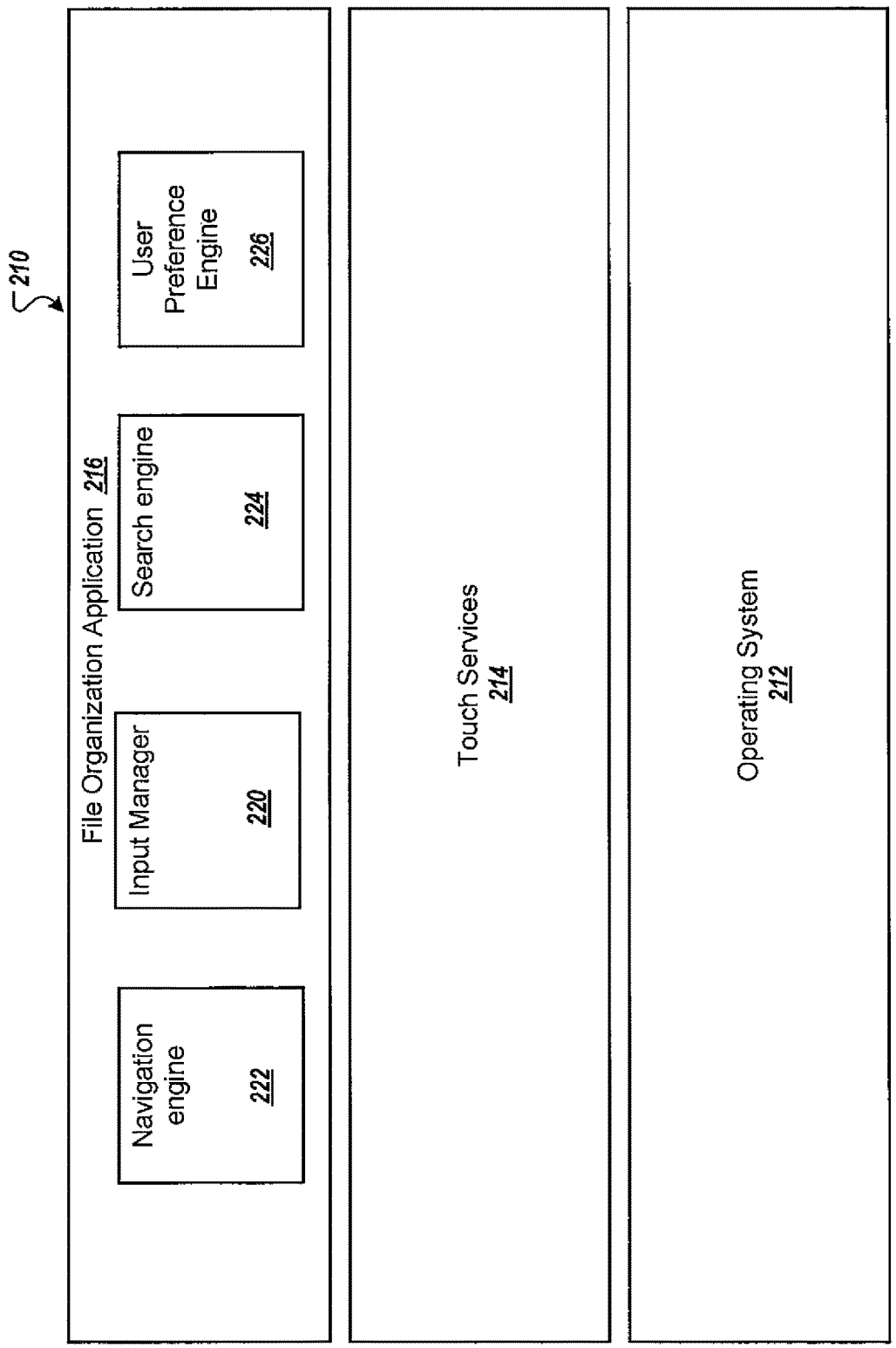
FIG. 11 is a block diagram of an example software architecture for implementing file organization applications.

FIG. 11 illustrates example software architecture 210 for implementing file organization applications. Example software architecture 210 can be used to implement the methods described above with reference to FIGS. 8 to 10.

Software architecture 210 can include operating system 212, touch services module 214, and file organization application 216. This architecture can conceptually operate on top of a hardware layer (not shown).

Operating system 212 provides an interface to the hardware layer (e.g., a capacitive touch display or device). Operating system 212 can include one or more software drivers that communicates with the hardware. For example, the drivers can receive and process touch input signals generated by a touch sensitive display or device in the hardware layer. The operating system 212 can process raw input data received from the driver(s). This processed input data can then be made available to touch services layer 214 through one or more application programming interfaces (APIs). These APIs can be a set of APIs that are usually included with operating systems (such as, for example, Linux or UNIX APIs), as well as APIs specific for sending and receiving data relevant to touch input.

Touch services module 214 can receive touch inputs from operating system layer 212 and convert one or more of these touch inputs into touch input events according to an internal touch event model. Touch services module 214 can use different touch models for different applications. For example, a file organization application will be interested in events that correspond to input requesting navigation of file structures, input for manipulation of file objects, and input interacting with search interfaces, and the touch model can be adjusted or selected accordingly to reflect the expected inputs.

The touch input events can be in a format (e.g., attributes) that are easier to use in an application than raw touch input signals generated by the touch sensitive device. For example, a touch input event can include a set of coordinates for each location at which a touch is currently occurring on a file view or file search user interface. Each touch input event can include information on one or more touches occurring simultaneously.

In some implementations, gesture touch input events can also be detected by combining two or more touch input events. The gesture touch input events can contain scale and/or rotation information. The rotation information can include a rotation value that is a relative delta in degrees. The scale information can also include a scaling value that is a relative delta in pixels on the display device. Other gesture events are possible.

All or some of these touch input events can be made available to developers through a touch input event API. The touch input API can be made available to developers as a Software Development Kit (SDK) or as part of an application (e.g., as part of a browser tool kit).

File organization application 216 can be a file organization application executing on a device. File organization application 216 can include input manager 220, navigation engine 222, search engine 224, and user preference engine 226. These components can be communicatively coupled to one or more of each other. Though the components identified above are described as being separate or distinct, two or more of the components may be combined in a single process or routine. The functional description provided herein including separation of responsibility for distinct functions is by way of example. Other groupings or other divisions of functional responsibilities can be made as necessary or in accordance with design preferences.

Input manager 220 receives touch input events from touch services layer 214, for example, through a function call having a defined call convention based on the touch API. Input manager 220 can pull data from touch services layer 214 (e.g., by querying touch services layer 214 for data) or can receive data that is pushed from touch services layer 214 (e.g., as the touch input events are generated by the touch services layer). Input manager 220 processes these events as they are received and provides the event data to navigation engine 222 or search engine 224, as appropriate.

Search engine 224 receives a search request, performs a search, and returns search results. User preference engine 226 manages one or more preferences input by a user, for example, preferences specifying sensitivity to user finger movements, such as the distance thresholds and time thresholds.

Example Device Architecture

The following provides more details on the implementation of device 100 and its components. For example, touch-sensitive display 102 can implement liquid crystal display (LCD) technology, light emitting polymer display (LPD) technology, or some other display technology. In addition, device 100 can include a touch-sensitive surface (e.g., a trackpad or touchpad).

In some implementations, touch-sensitive display 102 can include a multi-touch-sensitive display. A multi-touch-sensitive display can, for example, process multiple simultaneous points of input, including processing data related to the pressure, degree, and/or position of each point of input. Such processing facilitates gestures and interactions with multiple fingers, chording, and other interactions. Other touch-sensitive display technologies can also be used, e.g., a display in which contact is made using a stylus or other pointing device.

A user can interact with device 100 using various touch inputs, e.g., when a user touches touch sensitive display 102. Gesture inputs can also be derived from multiple touch inputs, e.g., where a user moves his or her finger (or other input tool) across touch sensitive display 102. An example gesture input is a swipe input, where a user swipes his or her finger (or other input tool) across touch-sensitive display 102. In some implementations, the device can detect inputs that are received in direct contact with display 102, or that are received within a particular distance of display 102 (e.g., within one or two inches along a direction perpendicular to surface of display 102). Users can simultaneously provide input at multiple locations on display 102. For example, inputs simultaneously touching at two or more locations can be received.

In some implementations, device 100 can display one or more graphical user interfaces on touch-sensitive display 102 for providing the user access to various system objects and for conveying information to the user.

In some implementations, device 100 can implement various device functionalities. As part of one or more of these functionalities, device 100 presents graphical user interfaces on touch-sensitive display 102 of device 100, and also responds to touch input received from a user, for example, through touch-sensitive display 102. For example, a user can invoke various functions by launching one or more applications on the device. The applications can include, for example, a file organization program.

Figure 12:
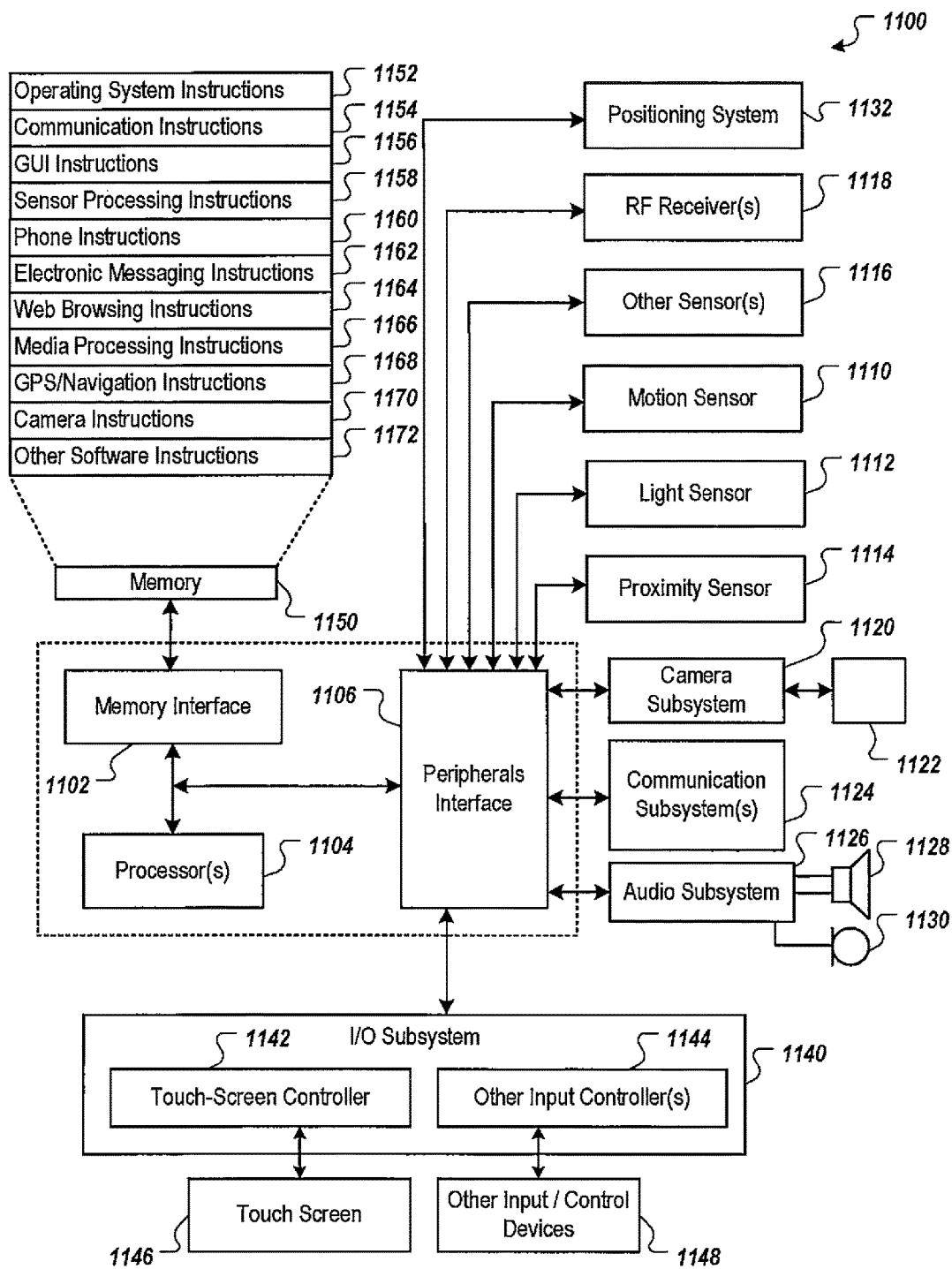
FIG. 12 is a block diagram of an example hardware architecture of a device for organizing files and data.

FIG. 12 is a block diagram of example hardware architecture of device 1100 for navigating file structures, navigating data hierarchies, and searching objects using 3D gesture inputs. Device 1100 can include memory interface 1102, one or more data processors, image processors and/or central processing units 1104, and peripherals interface 1106. Memory interface 1102, one or more processors 1104 and/or peripherals interface 1106 can be separate components or can be integrated in one or more integrated circuits. The various components in device 1100 can be coupled by one or more communication buses or signal lines.

Sensors, devices, and subsystems can be coupled to peripherals interface 1106 to facilitate multiple functionalities. For example, motion sensor 1110, light sensor 1112, and proximity sensor 1114 can be coupled to peripherals interface 1106 to facilitate various orientation, lighting, and proximity functions. For example, in some implementations, light sensor 1112 can be utilized to facilitate adjusting the brightness of touch screen 1146. In some implementations, motion sensor 1111 (e.g., an accelerometer, velicometer, or gyroscope) can be utilized to detect movement of the device. Accordingly, display objects and/or media can be presented according to a detected orientation, e.g., portrait or landscape.

Other sensors 1116 can also be connected to peripherals interface 1106, such as a temperature sensor, a biometric sensor, or other sensing device, to facilitate related functionalities.

Location determination functionality can be facilitated through positioning system 1132. Positioning system 1132, in various implementations, can be a component internal to device 1100, or can be an external component coupled to device 1100 (e.g., using a wired connection or a wireless connection). In some implementations, positioning system 1132 can include a GPS receiver and a positioning engine operable to derive positioning information from received GPS satellite signals. In other implementations, positioning system 1132 can include a compass (e.g., a magnetic compass) and an accelerometer, as well as a positioning engine operable to derive positioning information based on dead reckoning techniques. In still further implementations, positioning system 1132 can use wireless signals (e.g., cellular signals, IEEE 802.11 signals) to determine location information associated with the device. Hybrid positioning systems using a combination of satellite and television signals, such as those provided by ROSUM CORPORATION of Mountain View, Calif., can also be used. Other positioning systems are possible.

Broadcast reception functions can be facilitated through one or more radio frequency (RF) receiver(s) 1118. An RF receiver can receive, for example, AM/FM broadcasts or satellite broadcasts (e.g., XM® or Sirius® radio broadcast). An RF receiver can also be a TV tuner. In some implementations, RF receiver 1118 is built into wireless communication subsystems 1124. In other implementations, RF receiver 1118 is an independent subsystem coupled to device 1100 (e.g., using a wired connection or a wireless connection). RF receiver 1118 can receive simulcasts. In some implementations, RF receiver 1118 can include a Radio Data System (RDS) processor, which can process broadcast content and simulcast data (e.g., RDS data). In some implementations, RF receiver 1118 can be digitally tuned to receive broadcasts at various frequencies. In addition, RF receiver 1118 can include a scanning function which tunes up or down and pauses at a next frequency where broadcast content is available.

Camera subsystem 1120 and optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1124. Communication subsystem(s) can include one or more wireless communication subsystems and one or more wired communication subsystems. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving and/or transmitting data. The specific design and implementation of communication subsystem 1124 can depend on the communication network(s) or medium(s) over which device 1100 is intended to operate. For example, device 1100 may include wireless communication subsystems designed to operate over a global system for mobile communications (GSM) network, a GPRS network, an enhanced data GSM environment (EDGE) network, 802.x communication networks (e.g., Wi-Fi, WiMax, or 3G networks), code division multiple access (CDMA) networks, and a Bluetooth™ network. Communication subsystems 1124 may include hosting protocols such that device 1100 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1126 can be coupled to speaker 1128 and one or more microphones 1130. One or more microphones 1130 can be used, for example, to facilitate voice-enabled functions, such as voice recognition, voice replication, digital recording, and telephony functions.

I/O subsystem 1140 can include touch screen controller 1142 and/or other input controller(s) 1144. Touch-screen controller 1142 can be coupled to touch screen 1146. Touch screen 1146 and touch screen controller 1142 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 1146 or proximity to touch screen 1146.

Other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of speaker 1128 and/or microphone 1130.

In one implementation, a pressing of the button for a first duration may disengage a lock of touch screen 1146; and a pressing of the button for a second duration that is longer than the first duration may turn power to device 1100 on or off. The user may be able to customize a functionality of one or more of the buttons. Touch screen 1146 can, for example, also be used to implement virtual or soft buttons and/or a keyboard.

In some implementations, device 1100 can present recorded audio and/or video files, such as MP3, AAC, and MPEG files. In some implementations, device 1100 can include the functionality of an MP3 player, such as an iPhone™.

Memory interface 1102 can be coupled to memory 1150. Memory 1150 can include high-speed random access memory and/or non-volatile memory, such as one or more magnetic disk storage devices, one or more optical storage devices, and/or flash memory (e.g., NAND, NOR). Memory 1150 can store operating system 1152, such as Darwin, RTXC, LINUX, UNIX, OS X, WINDOWS, or an embedded operating system such as VxWorks. Operating system 1152 may include instructions for handling basic system services and for performing hardware dependent tasks. In some implementations, operating system 1152 can be a kernel (e.g., UNIX kernel).

Memory 1150 may also store communication instructions 1154 to facilitate communicating with one or more additional devices, one or more computers and/or one or more servers. Communication instructions 1154 can also be used to select an operational mode or communication medium for use by the device, based on a geographic location (obtained by GPS/Navigation instructions 1168) of the device. Memory 1150 may include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GPS/Navigation instructions 1168 to facilitate GPS and navigation-related processes and instructions, e.g., mapping a target location; camera instructions 1170 to facilitate camera-related processes and functions; and/or other software instructions 1172 to facilitate other processes and functions, e.g., security processes and functions, device customization processes and functions (based on predetermined user preferences), and other software functions. Memory 1150 may also store other software instructions (not shown), such as web video instructions to facilitate web video-related processes and functions; and/or web shopping instructions to facilitate web shopping-related processes and functions. In some implementations, media processing instructions 1166 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 1150 can include additional instructions or fewer instructions. Furthermore, various functions of device 1100 may be implemented in hardware and/or in software, including in one or more signal processing and/or application specific integrated circuits.

Example Network Operating Environment for Devices

Figure 13:
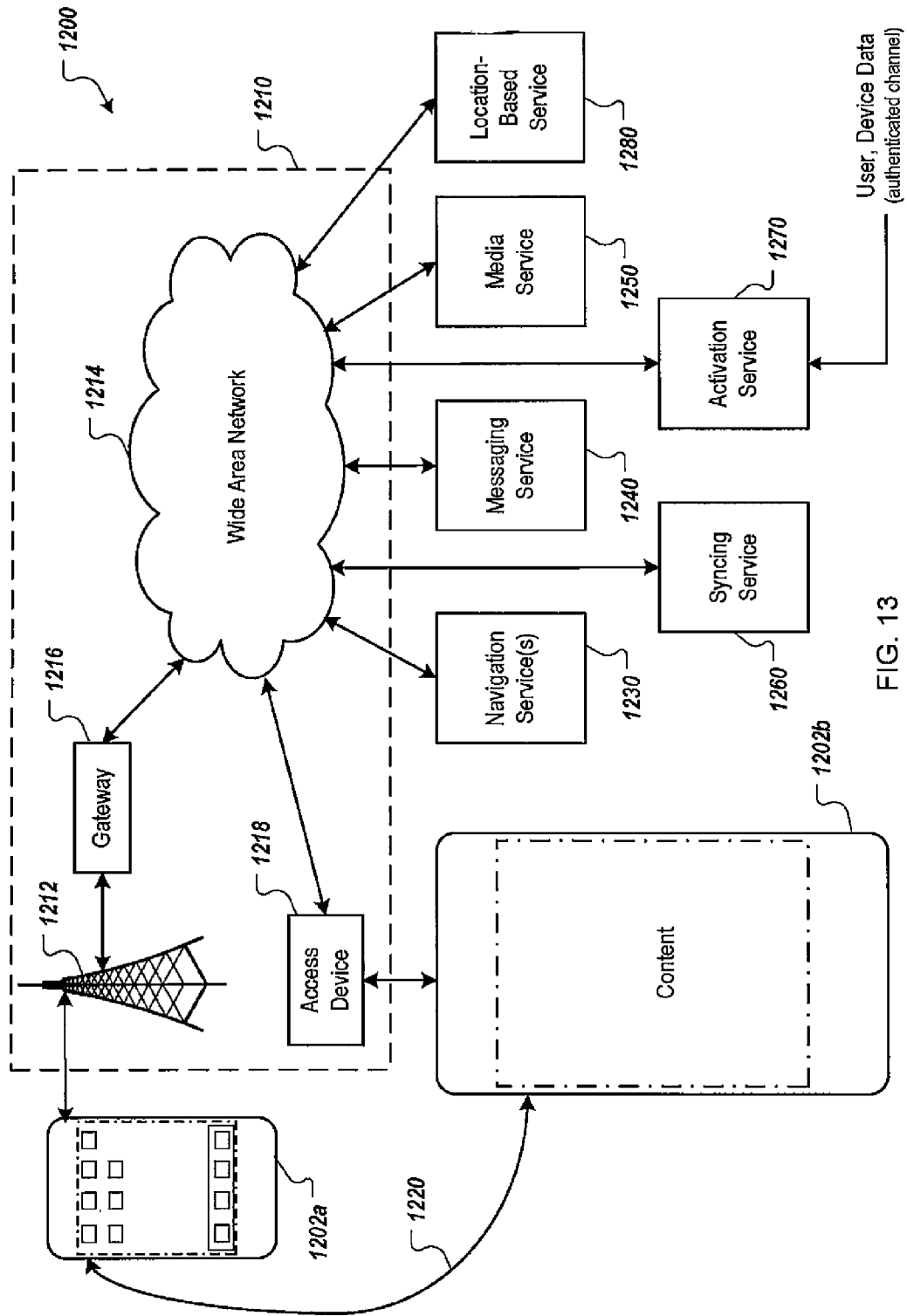
FIG. 13 is a block diagram of an example network operating environment for devices for organizing files and data.

FIG. 13 is a block diagram of example network operating environment 1200 for devices for navigating file structures, navigating data hierarchies, and searching objects using 3D gesture inputs. Devices 1202a and 1202b can, for example, communicate over one or more wired and/or wireless networks 1210 in data communication. For example, wireless network 1212, e.g., a cellular network, can communicate with a wide area network (WAN) 1214, such as the Internet, by use of gateway 1216. Likewise, access device 1218, such as an 802.11g wireless access device, can provide communication access to wide area network 1214. In some implementations, both voice and data communications can be established over wireless network 1212 and access device 1218. For example, device 1202a can place and receive phone calls (e.g., using VoIP protocols), send and receive e-mail messages (e.g., using POP3 protocol), and retrieve electronic documents and/or streams, such as web pages, photographs, and videos, over wireless network 1212, gateway 1216, and wide area network 1214 (e.g., using TCP/IP or UDP protocols). Likewise, in some implementations, device 1202b can place and receive phone calls, send and receive e-mail messages, and retrieve electronic documents over access device 1218 and wide area network 1214. In some implementations, devices 1202a or 1202b can be physically connected to access device 1218 using one or more cables and access device 1218 can be a personal computer. In this configuration, device 1202a or 1202b can be referred to as a "tethered" device.

Devices 1202a and 1202b can also establish communications by other means. For example, wireless device 1202a can communicate with other wireless devices, e.g., other devices 1202a or 1202b, cell phones, etc., over wireless network 1212. Likewise, devices 1202a and 1202b can establish peer-to-peer communications 1220, e.g., a personal area network, by use of one or more communication subsystems, such as a Bluetooth™ communication device. Other communication protocols and topologies can also be implemented.

Device 1202a or 1202b can also access other data and content over one or more wired and/or wireless networks 1210. For example, content publishers, such as news sites, RSS feeds, web sites, blogs, social networking sites, developer networks, etc., can be accessed by device 1202a or 1202b. Such access can be provided by invocation of a web browsing function or application (e.g., a browser) in response to a user touching, for example, a Web object.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include non-transitory computer readable storage media such as all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   while in a respective mode other than a layer switching mode:
      displaying a user interface that includes a plurality of objects arranged into a plurality of layers; and
      detecting a first user input comprising hovering of one or more fingers above a display surface of a display;
   in response to detecting the first user input:
      in accordance with a determination that the first user input does not meet first criteria, wherein the first criteria include a requirement that at least a predetermined number of fingers is detected over the display, wherein the predetermined number of fingers is greater than one, remaining in the respective mode without entering the layer switching mode; and
      in accordance with a determination that the first user input meets first criteria, entering the layer switching mode;
   while in the layer switching mode:
      detecting a second user input comprising a first three-dimensional (3D) gesture input having a first movement in proximity to the display surface of the display, the first movement having a first component that is perpendicular to the display surface;
      navigating to a layer of the plurality of layers in response to the first movement component of the second user input, wherein the layer includes a plurality of objects and the layer is activated; and
      upon navigating to the layer of the plurality of layers, rendering on the display more than one of the plurality of objects in the activated layer automatically without requiring additional user input;
   detecting a third user input comprising a second 3D gesture input having a second movement in proximity to the display surface, the second movement having a second component that is parallel to the display surface; and
   navigating within the activated layer based on the second movement component of the third user input.

2. The method of claim 1 in which arranging objects in a plurality of layers comprises arranging representations of file objects in a plurality of layers, each file object comprising a file or a folder.

3. The method of claim 2, further comprising presenting a 3D view of the representations of file objects on the display, and rendering the representations in different layers visible on the display in response to 3D gesture inputs having movement components that are perpendicular to the display surface.

4. The method of claim 2 in which the first 3D gesture input, the second 3D gesture input, or a combination of the first 3D gesture input and the second 3D gesture input indicates selection of a first file object in a first layer, moving from the first layer to the second layer, and dropping the first file object into a second file object in a second layer.

5. The method of claim 1 in which detecting a second user input comprises detecting a second user input that comprises a pinch-and-pull gesture input that includes a movement away from the display surface, and
   the method further comprises navigating from a first layer in the plurality of layers to a second layer in the plurality of layers that is above the first layer in response to the pinch-and-pull gesture input.

6. The method of claim 1 in which detecting a second user input comprises detecting a second user input that comprises a pinch-and-push gesture input that includes a movement towards the display surface, and
    the method further comprises navigating from a first layer in the plurality of layers to a second layer in the plurality of layers that is below the first layer in response to the pinch-and-push gesture input.

7. The method of claim 1 in which detecting the second user input comprises detecting a movement of a finger or a pointing device relative to the display surface, and
    the method further comprises moving from a first layer in the plurality of layers to a second layer in the plurality of layers above the first layer in response to the finger or pointing device moving away from the display surface, and moving from the second layer to a third layer in the plurality of layers below the second layer in response to the finger or pointing device moving toward the display surface.

8. The method of claim 1 in which arranging objects in a plurality of layers comprises arranging groups of objects that are associated with a same time period in the same layer, different layers having objects that are associated with different time periods.

9. The method of claim 8 in which arranging objects in a plurality of layers comprises arranging backup files that that are associated with a same time period in the same layer, different layers having backup files that that are associated with different time periods, and
    the method further comprises identifying backup files that are associated with different time periods based on different amounts of movement components that are perpendicular to the display surface.

10. The method of claim 1 in which the first criteria further includes detecting a first finger of the one or more fingers moving relative to a second finger of the one or more fingers prior to detecting movement perpendicular to the display.

11. The method of claim 1 wherein navigating to a layer of the plurality of layers includes navigating to the layer based on a number of fingers used in the first movement component of the second user input.

12. The method of claim 1 wherein navigating to a layer of the plurality of layers includes navigating to the layer based on a distance between a first finger and a second finger used in the first movement component of the second user input.

13. A computer-implemented method, comprising:
    identifying a data hierarchy, wherein the data hierarchy includes a plurality of levels;
    while in a respective mode other than a layer switching mode:
        displaying a user interface that includes a plurality of objects arranged into the plurality of levels; and
        detecting a first user input comprising hovering of one or more fingers above a display surface of a display;
    in response to detecting the first user input:
        in accordance with a determination that the first user input does not meet first criteria, wherein the first criteria include a requirement that at least a predetermined number of fingers is detected over the display, wherein the predetermined number of fingers is greater than one, remaining in the respective mode without entering the layer switching mode; and
        in accordance with a determination that the first user input meets first criteria, entering the layer switching mode;
    while in the layer switching mode:
        detecting a second user input comprising a first three-dimensional (3D) gesture input having a first movement in proximity to the display surface of the display, the first movement having a first component that is perpendicular to the display surface; and
        navigating the data hierarchy or manipulating an object in the data hierarchy based on the second user input, including navigating to a level of the plurality of levels of the data hierarchy, wherein the level includes a plurality of objects, based on the first movement component that is perpendicular to the display surface and activating the level of the plurality of levels;
    detecting a third user input comprising a second 3D gesture input having a second movement in proximity to the display surface, the second movement having a second component that is parallel to the display surface; and
    navigating within the activated level based on the second movement component of the third user input.

14. The method of claim 13 in which detecting the second user input comprises detecting a movement of a finger or a pointing device relative to the display surface, and
    the method further comprises moving from a first level in the plurality of levels to a second level in the plurality of levels that is higher than the first level in response to the finger or pointing device moving away from the display surface, and moving from the second level to a third level in the plurality of levels that is lower than the second level in response to the finger or pointing device moving toward the display surface.

15. A computer-implemented method, comprising:
    providing a search interface that concurrently provides a plurality of views of search results on a display, each view arranging the search results according to at least one of a plurality of file object properties in a plurality of layers, wherein at least some of the search results in a first view of the plurality of views are included in a second view of the plurality of views and the first view arranges the search results according to a different set of file object properties than the second view;
    detecting a first user input comprising a first three-dimensional (3D) gesture input having a first movement in proximity to a display surface of the display, the first movement having a first component parallel to the display surface;
    navigating to a respective view of the plurality of views in response to the first movement component of the first user input, wherein the respective view is activated;
    detecting a second user input comprising a second 3D gesture input having a second movement in proximity to the surface, the second movement having a second component perpendicular to the display surface; and
    navigating to a respective layer of the plurality of layers within the activated view in response to the second movement component of the second user input, the respective layer includes a subgroup of the search results.

16. The method of claim 15 in which providing a search interface comprises providing a search interface that concurrently provides a plurality of views of file objects resulting from a search, each view presenting the file objects according to at least one of a plurality of properties of the file objects.

17. The method of claim 16 in which providing a search interface that concurrently provides a plurality of views of file objects comprises providing a search interface that concurrently provides a plurality of views of electronic mail or message items resulting from a search, each view presenting the electronic mail or message items according to at least one of a plurality of properties of the electronic mail or message items.

18. The method of claim 16 in which the plurality of properties comprise at least one of name, size, created date, modified date, file extension type, sent time, received time, subject line, attachment, or priority.

19. The method of claim 16 further comprising, detecting a third user input comprising a third 3D gesture input comprising a third movement in proximity to the display surface, the third movement having a third component parallel to the surface, wherein the third user input indicates removal of at least one of the file objects.

20. The method of claim 19 in which the third user input indicating removal of the at least one of the file objects comprises a flicking gesture resembling flicking away the at least one of the file objects.

21. An apparatus comprising:
a sensor module configured to:
  detect a first user input comprising hovering of one or more fingers above a display surface of a display;
  after detecting the first user input, detect a second user input comprising a first three-dimensional (3D) gesture input having a first movement in proximity to the display surface of the display, the first movement having a first component that is perpendicular to the display surface; and
  detect a third user input comprising a second 3D gesture input having a second movement in proximity to the display surface, the second movement having a second component that is parallel to the display surface; and
a data processor configured to:
while in a respective mode other than a layer switching mode:
  display a user interface that includes a plurality of objects arranged into a plurality of layers; and
  in response to the detection of the first user input;
    in accordance with a determination that the first user input does not meet first criteria, wherein the first criteria include a requirement that at least a predetermined number of fingers is detected over the display, wherein the predetermined number of fingers is greater than one, remaining in the respective mode without entering the layer switching mode; and
    in accordance with a determination that the first user input meets first criteria, entering the layer switching mode;
while in the layer switching mode:
  in response to the first movement component of the second user input, navigate to a layer of the plurality of layers, wherein the layer includes a plurality of objects and the layer is activated; and
  upon navigating to the layer of the plurality of layers, render on the display more than one of the plurality of objects in the activated layer automatically without requiring additional user input; and
  in response to the second movement component of the third user input, navigate within the activated layer based on the third user input.

22. The apparatus of claim 21, further comprising a storage device to store information about a mapping between movements in proximity to the display surface and predefined 3D gestures.

23. The apparatus of claim 22 in which the sensor module comprises a capacitive based touch sensor that can detect the 3D gesture inputs.

24. The apparatus of claim 21 wherein displaying a user interface that includes a plurality of objects arranged into a plurality of layers comprises representations of file objects arranged in a plurality of layers, each file object comprising a file or a folder.

25. The apparatus of claim 24, wherein the data processor is further configured to:
present a 3D view of the representations of file objects on the display; and
render the representations in different layers visible on the display in response to 3D gesture inputs having movement components that are perpendicular to the display surface.

26. The apparatus of claim 24 wherein the first 3D gesture input, the second 3D gesture input, or a combination of the first 3D gesture input and the second 3D gesture input indicates selection of a first file object in a first layer, moving from the first layer to the second layer, and dropping the first file object into a second file object in a second layer.

27. The apparatus of claim 21 wherein:
detecting a second user input comprises detecting a second user input that comprises a pinch-and-pull gesture input that includes a movement away from the display surface; and
the data processor is further configured to navigate from a first layer in the plurality of layers to a second layer in the plurality of layers that is above the first layer in response to the pinch-and-pull gesture input.

28. The apparatus of claim 21 wherein:
detecting a second user input comprises detecting a second user input that comprises a pinch-and-push gesture input that includes a movement towards the display surface, and
the data processor is further configured to navigate from a first layer in the plurality of layers to a second layer in the plurality of layers that is below the first layer in response to the pinch-and-push gesture input.

29. The apparatus of claim 21 wherein:
detecting the second user input comprises detecting a movement of a finger or a pointing device relative to the display surface, and
the data processor is further configured to move from a first layer in the plurality of layers to a second layer in the plurality of layers above the first layer in response to the finger or pointing device moving away from the display surface, and move from the second layer to a third layer in the plurality of layers below the second layer in response to the finger or pointing device moving toward the display surface.

30. The apparatus of claim 24 wherein displaying a user interface that includes a plurality of objects arranged into a plurality of layers comprises displaying groups of objects that are associated with a same time period in the same layer, different layers having objects that are associated with different time periods.

31. The apparatus of claim 30 wherein:
displaying a user interface that includes a plurality of objects arranged into a plurality of layers comprises displaying backup files that that are associated with a same time period in the same layer, different layers having backup files that that are associated with different time periods, and the data processor is further configured to identify backup files that are associated with different time periods based on different amounts of movement components that are perpendicular to the display surface.

32. The apparatus of claim 24 in which the first criteria further includes detecting a first finger of the one or more fingers moving relative to a second finger of the one or more fingers prior to detecting movement perpendicular to the display.

33. The apparatus of claim 24 wherein navigating to a layer of the plurality of layers includes navigating to the layer based on a number of fingers used in the first movement component of the second user input.

34. The apparatus of claim 21 wherein navigating to a layer of the plurality of layers includes navigating to the layer based on a distance between a first finger and a second finger used in the first movement component of the second user input.

35. A non-transitory computer readable storage medium storing instructions that, when executed by a data processing apparatus, cause the data processing apparatus to perform operations comprising:
   while in a respective mode other than a layer switching mode:
      displaying a user interface that includes a plurality of objects arranged into a plurality of layers; and
      detecting a first user input comprising hovering of one or more fingers above a display surface of a display;
   in response to detecting the first user input:
      in accordance with a determination that the first user input does not meet first criteria, wherein the first criteria include a requirement that at least a predetermined number of fingers is detected over the display, wherein the predetermined number of fingers is greater than one, remaining in the respective mode without entering the layer switching mode; and
      in accordance with a determination that the first user input meets first criteria, entering the layer switching mode;
   while in the layer switching mode:
      detecting a second user input comprising a first three-dimensional (3D) gesture input having a first movement in proximity to the display surface of the display, the first movement having a first component that is perpendicular to the display surface;
      navigating to a layer of the plurality of layers in response to the first movement component of the second user input, wherein the layer includes a plurality of objects and the layer is activated; and
      upon navigating to the layer of the plurality of layers, rendering on the display more than one of the plurality of objects in the activated layer automatically without requiring additional user input;
      detecting a third user input comprising a second 3D gesture input having a second movement in proximity to the display surface, the second movement having a second component that is parallel to the display surface; and
      navigating within the active layer based on the second movement component of the third user input.

36. The non-transitory computer readable storage medium of claim 35 wherein arranging objects in a plurality of layers comprises arranging representations of file objects in a plurality of layers, each file object comprising a file or a folder.

37. The non-transitory computer readable storage medium of claim 36, wherein the instructions, when executed by a data processing apparatus, further cause the data processing apparatus to perform operations comprising:
   presenting a 3D view of the representations of file objects on the display; and
   rendering the representations in different layers visible on the display in response to 3D gesture inputs having movement components that are perpendicular to the display surface.

38. The non-transitory computer readable storage medium of claim 36 wherein the first 3D gesture input, the second 3D gesture input, or a combination of the first 3D gesture input and the second 3D gesture input indicates selection of a first file object in a first layer, moving from the first layer to the second layer, and dropping the first file object into a second file object in a second layer.

39. The non-transitory computer readable storage medium of claim 35 wherein:
   detecting a second user input comprises detecting a second user input that comprises a pinch-and-pull gesture input that includes a movement away from the display surface, and the instructions, when executed by a data processing apparatus, further cause the data processing apparatus to perform operations comprising navigating from a first layer in the plurality of layers to a second layer in the plurality of layers that is above the first layer in response to the pinch-and-pull gesture input.

40. The non-transitory computer readable storage medium of claim 35 wherein:
   detecting a second user input comprises detecting a second user input that comprises a pinch-and-push gesture input that includes a movement towards the display surface, and the instructions, when executed by a data processing apparatus, further cause the data processing apparatus to perform operations comprising navigating from a first layer in the plurality of layers to a second layer in the plurality of layers that is below the first layer in response to the pinch-and-push gesture input.

41. The non-transitory computer readable storage medium of claim 35 wherein:
   detecting the second user input comprises detecting a movement of a finger or a pointing device relative to the display surface, and
   the instructions, when executed by a data processing apparatus, further cause the data processing apparatus to perform operations comprising moving from a first layer in the plurality of layers to a second layer in the plurality of layers above the first layer in response to the finger or pointing device moving away from the display surface, and moving from the second layer to a third layer in the plurality of layers below the second layer in response to the finger or pointing device moving toward the display surface.

42. The non-transitory computer readable storage medium of claim 35 wherein arranging objects in a plurality of layers comprises arranging groups of objects that are associated with a same time period in the same layer, different layers having objects that are associated with different time periods.

43. The non-transitory computer readable storage medium of claim 42 wherein:
   arranging objects in a plurality of layers comprises arranging backup files that that are associated with a same time period in the same layer, different layers having backup files that that are associated with different time periods, and the instructions, when executed by a data processing apparatus, further cause the data processing apparatus to perform operations comprising identifying backup files that are associated with different time periods based on different amounts of movement components that are perpendicular to the display surface.

44. The non-transitory computer readable storage medium of claim 35 wherein the first criteria further includes detecting a first finger of the one or more fingers moving relative to a second finger of the one or more fingers prior to detecting movement perpendicular to the display.

45. The non-transitory computer readable storage medium of claim 35 wherein navigating to a layer of the plurality of layers includes navigating to the layer based on a number of fingers used in the first movement component of the second user input.

46. The non-transitory computer readable storage medium of claim 35 wherein navigating to a layer of the plurality of layers includes navigating to the layer based on a distance between a first finger and a second finger used in the first movement component of the second user input.

* * * * *

UNITED STATES PATENT AND TRADEMARK OFFICE
CERTIFICATE OF CORRECTION

PATENT NO.        : 10,007,393 B2
APPLICATION NO.   : 12/689834
DATED             : June 26, 2018
INVENTOR(S)       : Nicholas V. King et al.

Page 1 of 1

It is certified that error appears in the above-identified patent and that said Letters Patent is hereby corrected as shown below:

In Column 23, Claim 9, Line 25, delete "that that" and insert -- that --, therefor.
In Column 23, Claim 9, Line 27, delete "that that" and insert -- that --, therefor.
In Column 26, Claim 30, Line 58, delete "claim 24" and insert -- claim 21 --, therefor.
In Column 26, Claim 31, Line 67, delete "that that" and insert -- that --, therefor.
In Column 27, Claim 31, Line 2, delete "that that" and insert -- that --, therefor.
In Column 27, Claim 32, Line 8, delete "claim 24" and insert -- claim 21 --, therefor.
In Column 27, Claim 33, Line 13, delete "claim 24" and insert -- claim 21 --, therefor.
In Column 28, Claim 43, Line 67, delete "that that" and insert -- that --, therefor.
In Column 29, Claim 43, Line 2, delete "that that" and insert -- that --, therefor.

Signed and Sealed this
Eighteenth Day of June, 2019

Andrei Iancu
*Director of the United States Patent and Trademark Office*